United States Patent
Yano et al.

(10) Patent No.: US 9,556,352 B2
(45) Date of Patent: Jan. 31, 2017

(54) PRIMER FOR FOOTWEAR CONSTITUTING MEMBERS, METHOD FOR PRODUCING SAME, FOOTWEAR CONSTITUTING MEMBER, AND FOOTWEAR

(71) Applicant: UNITIKA LTD., Hyogo (JP)

(72) Inventors: Takuma Yano, Kyoto (JP); Kenjin Shiba, Kyoto (JP)

(73) Assignee: UNITIKA LTD., Hyogo (JP)

( * ) Notice: Subject to any disclaimer, the term of this patent is extended or adjusted under 35 U.S.C. 154(b) by 0 days.

(21) Appl. No.: 14/647,143

(22) PCT Filed: Dec. 4, 2013

(86) PCT No.: PCT/JP2013/082521
§ 371 (c)(1),
(2) Date: May 26, 2015

(87) PCT Pub. No.: WO2014/088015
PCT Pub. Date: Jun. 12, 2014

(65) Prior Publication Data
US 2015/0315400 A1  Nov. 5, 2015

(30) Foreign Application Priority Data
Dec. 4, 2012 (JP) .................. 2012-265289

(51) Int. Cl.
| | |
|---|---|
| C09D 123/20 | (2006.01) |
| C09D 123/08 | (2006.01) |
| C09D 123/14 | (2006.01) |
| C09J 123/26 | (2006.01) |
| A43B 9/12 | (2006.01) |

(52) U.S. Cl.
CPC .............. C09D 123/20 (2013.01); A43B 9/12 (2013.01); C09D 123/0869 (2013.01); C09D 123/14 (2013.01); C09J 123/26 (2013.01)

(58) Field of Classification Search
CPC ................ C09D 123/14; C09D 123/20; C09D 123/0869; C09J 123/26; A43B 9/12
See application file for complete search history.

(56) References Cited

U.S. PATENT DOCUMENTS

| | | | | |
|---|---|---|---|---|
| 6,008,286 | A * | 12/1999 | Groves .................. | C08G 18/10 524/505 |
| 2011/0111208 | A1 | 5/2011 | D'Herbecourt | |
| 2011/0112229 | A1* | 5/2011 | Nagaoka ............... | C09D 5/002 524/186 |

FOREIGN PATENT DOCUMENTS

| | | |
|---|---|---|
| CN | 1259967 A | 7/2000 |
| CN | 102124062 A | 7/2011 |
| JP | 2003-521547 | 7/2003 |
| JP | 2008-69254 | 3/2008 |
| JP | 2009-79078 | 4/2009 |
| JP | 2009-114319 | 5/2009 |
| JP | 2011-528057 | 11/2011 |

OTHER PUBLICATIONS

International Search Report in corresponding PCT application PCT/JP2013/082521.
English language machine translation of JP2009-114319.
English language machine translation of JP2009-79078.
English language machine translation of JP2008-69254.
Office Action in corresponding Chinese Patent Application No. 201380062571.1, dated Jul. 5, 2016.

* cited by examiner

*Primary Examiner* — Robert Jones, Jr.
(74) *Attorney, Agent, or Firm* — Fildes & Outland, P.C.

(57) ABSTRACT

The present invention provides a primer for footwear constituting members, wherein the primer includes an acid-modified polyolefin resin and a medium; the acid-modified polyolefin resin is a copolymer including an olefin unit and an unsaturated carboxylic acid unit; the copolymer includes as the olefin unit, a propylene unit (A) and an olefin unit (B) other than the propylene unit; the mass ratio (A/B) between the propylene unit (A) and the olefin unit (B) other than the propylene unit is 60/40 to 95/5; and the content of the unsaturated carboxylic acid unit is 0.1 to 10 parts by mass in relation to 100 parts by mass of the total amount of (A) and (B).

12 Claims, No Drawings

PRIMER FOR FOOTWEAR CONSTITUTING MEMBERS, METHOD FOR PRODUCING SAME, FOOTWEAR CONSTITUTING MEMBER, AND FOOTWEAR

TECHNICAL FIELD

The present invention relates to a primer for allowing footwear constituting members to adhere to each other.

BACKGROUND ART

In the production of footwear, a technique to allow a plurality of members different in chemical properties or mechanical properties from each other to adhere to each other is important. In particular, in the production of sports shoes undergoing strong stress during use, a technique allowing the constitutional members of sports shoes to strongly adhere to each other is required. As an adhesion technique developing such strong adhesiveness, there has hitherto been a method in which the individual constitutional members are, if necessary, beforehand subjected to treatments such as degreasing, buffing and primer coating, then coated with an adhesive, and allowed to adhere to each other through the intermediary of the adhesive. Among these treatments before the coating of the adhesive, the primer coating assumes a significant role with respect to the adhesiveness between the footwear constituting members and the adhesive, and plays an important role as the adhesion technique for footwear.

Sports shoes are always required to achieve high functionalization in, for example, various performances such as cushioning property, lightweighting and design. In order to cope with the need for such high functionalization, novel materials have been proposed day after day for the constitutional members of footwear. Naturally, when such novel materials are used for the constitutional members of footwear, a high level adhesion technique is required. However, even when such novel materials are proposed, no sufficient adhesiveness is obtained by using conventional primers, and hence practical use of such novel materials is sometimes impossible. In other words, novel materials simultaneously require primers compatible therewith.

For the purpose of being adapted to such novel materials, primers for footwear have been proposed in Patent Literature 1 and Patent Literature 2.

CITATION LIST

Patent Literature

Patent Literature 1: National Publication of International Patent Application No. 2003-521547
Patent Literature 2: National Publication of International Patent Application No. 2011-528057

SUMMARY OF INVENTION

Technical Problem

However, even the primers described in Patent Literature 1 and Patent Literature 2 cannot allow some materials to be made to sufficiently adhere. Examples of such materials include polyolefin-based resins. The use of various polyolefin-based resins, in particular, for the members constituting soles of shoes, allows high functionalization such as lightweighting to be frequently achieved. However, polyolefin-based resins are nonpolar or weakly polar, no adhesion technique can ever achieve sufficient adhesiveness, and even by using the primers described in Patent Literature 1 and Patent Literature 2, no sufficient adhesion is achieved. The primer described in Patent Literature 1 uses a chlorinated resin, and involves a problem of discard after use.

Footwear is used in various environments and frequently in long periods of time. Accordingly, the adhesiveness between individual footwear constituting members is required to be sufficiently secured even when the footwear is used in a harsh environment for a long period of time. Moreover, footwear is also used in an extremely cold district, and hence sufficient adhesiveness is preferably secured even under subfreezing use conditions. However, the retention of the adhesiveness or the primer effect under such use conditions is not described at all in Patent Literature 1 and Patent Literature 2.

The present invention eliminates such drawbacks of the conventional techniques, and takes as its technical problem to provide a primer for footwear capable of allowing even footwear constituting members made of polyolefin-based resins to adhere, securing sufficient adhesiveness even when used in a harsh environment for a long period of time, and moreover, maintaining satisfactory adhesiveness even in a subfreezing use environment.

Solution to Problem

The present inventors made a diligent study in order to solve the foregoing technical problem, and consequently have reached the present invention by discovering that a primer including an acid-modified polyolefin resin having a specific structure solves the foregoing technical problem.

Specifically, the gist of the present invention is as follows.

(1) A primer for footwear constituting members including an acid-modified polyolefin resin and a medium, wherein the acid-modified polyolefin resin is a copolymer including an olefin unit and an unsaturated carboxylic acid unit as copolymerization components; the copolymer includes as the olefin unit, a propylene unit (A) and an olefin unit (B) other than the propylene unit; the mass ratio (A/B) between the propylene unit (A) and the olefin unit (B) other than the propylene unit is 60/40 to 95/5; and the content of the unsaturated carboxylic acid unit is 0.1 to 10 parts by mass in relation to 100 parts by mass of the total amount of the propylene unit (A) and the olefin unit (B) other than the propylene unit.

(2) The primer for footwear constituting members according to (1), wherein the residual amount of the unreacted unsaturated carboxylic acid monomer component included in the acid-modified polyolefin resin is 10,000 ppm or less.

(3) The primer for footwear constituting members according to (1) or (2), wherein the medium is an aqueous medium, the acid-modified polyolefin resin is dispersed in the aqueous medium, and the weight average particle size of the acid-modified polyolefin resin dispersed in the aqueous medium is 0.5 µm or less.

(4) The primer for footwear constituting members according to any one of (1) to (3), wherein the olefin unit (B) other than the propylene unit is butene.

(5) The primer for footwear constituting members according to (3) or (4), wherein the degree of dispersion in the particle size distribution of the acid-modified polyolefin resin in the aqueous dispersion is 2.6 or less.

(6) The primer for footwear constituting members according to any one of (1) to (5), further including a polyurethane resin, wherein the content of the polyurethane resin is 5 to 300 parts by mass in relation to 100 parts by mass of the acid-modified polyolefin resin.

(7) The primer for footwear constituting members according to any one of (1) to (6), further including a cross-linking agent, wherein the content of the cross-linking agent is 0.1 to 30 parts by mass in relation to 100 parts by mass of the acid-modified polyolefin resin.

(8) The primer for footwear constituting members according to any one of (1) to (7), wherein the footwear constituting members are members made of a polyolefin-based resin.

(9) A footwear constituting member wherein a primer layer obtained from the primer for footwear constituting members according to any one of (1) to (8) is laminated on at least a part of the surface of the member.

(10) A set of footwear including the footwear constituting member according to (9).

(11) A set of footwear wherein the footwear constituting member according to (9) is made to adhere through the intermediary of a urethane-based adhesive provided on the primer layer.

(12) A method for producing a primer for footwear constituting members, wherein the production method is a method for producing the primer for footwear constituting members according to any one of (1) to (8); the acid-modified polyolefin resin, a basic compound, an organic solvent and water are stirred in a hermetically sealed vessel at 80 to 240° C.; subsequently, at least one selected from the basic compound, the organic solvent and water is added to the stirred mixture; and the resulting mixture is stirred in the hermetically sealed vessel at 80 to 240° C.

Advantageous Effects of Invention

The primer for footwear constituting members of the present invention has excellent adhesiveness to a footwear constituting member, in particular a footwear constituting member made of a polyolefin-based resin, and is capable of strongly incorporating a footwear constituting member into footwear to form a composite product (capable of bonding a footwear constituting member in footwear) through the intermediary of the adhesive provided on the primer layer obtained from the primer. Moreover, the adhesiveness of the primer is sufficiently secured even when the primer is used in a harsh environment for a long period of time. The primer for footwear constituting members of the present invention can sufficiently retain the adhesiveness in the case of repeated bending at a subfreezing temperature (hereinafter, sometimes referred to as "cold adhesiveness"). Accordingly, it is possible to provide footwear having satisfactory adhesiveness even when used in an extremely cold district, namely, footwear free from the delamination of the constituent materials even when used in an extremely cold district. The material constituting the primer for footwear constituting members of the present invention is a non-chlorine material.

DESCRIPTION OF EMBODIMENTS

Hereinafter, the present invention is described in detail.
The primer for footwear constituting members of the present invention includes an acid-modified polyolefin resin and a medium.

<Acid-Modified Polyolefin Resin>

First, the acid-modified polyolefin resin is described.
The acid-modified polyolefin resin in the present invention is a copolymer including, as the polymerization components, an olefin unit and an unsaturated carboxylic acid unit, and includes as the olefin unit a propylene unit (A) and an olefin unit (B) other than the propylene unit.

The mass ratio (A/B) between the propylene unit (A) and the olefin unit (B) other than the propylene unit is required to be 60/40 to 95/5 and is preferably 60/40 to 80/20, from the viewpoint of making small the dispersed particle size when the below-described aqueous dispersion is prepared, and from the viewpoint of improving the adhesiveness to the footwear constituting members when the coating of the aqueous dispersion is performed. When the proportion of the propylene unit (A) is less than 60% by mass, the adhesiveness to the footwear constituting members is degraded; on the other hand, when the proportion of the propylene unit (A) exceeds 95% by mass, the dispersed particle size sometimes comes to be large, or the adhesiveness or the cold adhesiveness to the footwear constituting members is sometimes degraded.

Examples of the olefin unit (B) other than the propylene unit include: alkenes such as ethylene, 1-butene, isobutene, 1-pentene, 4-methyl-1-pentene, 3-methyl-1-pentene, 1-hexene, 1-octene and norbornenes; and dienes such as butadiene and isoprene. Among these, butenes such as 1-butene and isobutene are preferable, and 1-butene is more preferable, from the viewpoints of, for example, the easiness in preparing an aqueous dispersion, the adhesiveness to the footwear constituting members, in particular the adhesiveness and the cold adhesiveness to the footwear constituting members made of a polyolefin-based resin. The olefin units (B) other than the propylene unit may be used as mixtures of two or more thereof, if necessary.

Examples of the copolymerization form between the propylene unit (A) and the olefin unit (B) other than the propylene unit include, without being limited to: random copolymerization, block copolymerization and graft copolymerization. Among these, from the viewpoint of easiness in polymerization, the random copolymerization is preferable.

The acid-modified polyolefin resin in the present invention is a copolymer including the polyolefin unit and the unsaturated carboxylic acid unit as the copolymerization components. From the viewpoints of the easiness in preparing an aqueous dispersion, the adhesiveness to the footwear constituting members and the adhesiveness to the adhesive used, the content of the unsaturated carboxylic acid unit is required to be 0.1 to parts by mass, is preferably 0.2 to 8 parts by mass, more preferably 0.3 to 7 parts by mass and furthermore preferably 0.5 to 7 parts by mass in relation to 100 parts by mass of the total amount (A+B) of the propylene unit (A) and the olefin unit (B) other than the propylene unit. When the content of the unsaturated carboxylic acid unit is less than 0.1 part by mass, the adhesiveness to the footwear constituting members tends to be degraded, and the preparation of the aqueous dispersion of the acid-modified polyolefin resin is difficult; on the other hand, when the content of the unsaturated carboxylic acid unit exceeds 10 parts by mass, the adhesiveness to the footwear constituting members is sometimes degraded.

Examples of the usable unsaturated carboxylic acid unit include: acrylic acid, methacrylic acid, maleic acid, maleic anhydride, itaconic acid, itaconic anhydride, aconitic acid, aconitic anhydride, fumaric acid, crotonic acid, citraconic acid, mesaconic acid and ally succinate; additionally, compounds each including in the molecule thereof (in the monomer unit) at least one carboxyl group or one acid anhydride group such as half esters and half amides of unsaturated dicarboxylic acids. Among these, from the viewpoint of the easiness in introducing into the polyolefin resin, maleic anhydride, acrylic acid and methacrylic acid are preferable, and maleic anhydride is more preferable.

The acid anhydride unit introduced into the acid-modified polyolefin resin tends to take an acid anhydride structure in a dry condition, and partially or wholly tends to undergo ring-opening to be a carboxylic acid or a salt thereof, in an aqueous medium containing the below-described basic compound.

The unsaturated carboxylic acid unit is only required to be copolymerized in the polyolefin resin, and examples of the copolymerization include random copolymerization, block copolymerization and graft copolymerization, and among these, graft copolymerization is preferable from the viewpoint of the productivity.

Examples of the graft copolymerization method introducing the unsaturated carboxylic acid unit into the polyolefin resin including the propylene unit (A) and the olefin unit (B) other than the propylene unit include, without being particularly limited to: a method in which in the presence of a radical generator, the polyolefin resin and the unsaturated carboxylic acid are heated for melting at a temperature equal to or higher than the melting point of the polyolefin resin so as be allowed to react with each other, and a method in which the polyolefin resin and the unsaturated carboxylic acid are dissolved in an organic solvent, and then heated and stirred in the presence of a radical generator so as to be allowed to react with each other. The former method is preferable because the operations involved are simple and easy.

Examples of the radical generator used in the graft copolymerization include: organic peroxides such as di-tert-butyl peroxide, dicumyl peroxide, tert-butyl hydroperoxide, tert-butyl cumyl peroxide, benzoyl peroxide, dilauryl peroxide, cumene hydroperoxide, tert-butylperoxy benzoate, methyl ethyl ketone peroxide and di-tert-butyl diperphthalate; and azonitriles such as azo-bis-isobutyronitrile. These agents may be appropriately selected to be used, according to the reaction temperature.

In the present invention, specific examples of the acid-modified polyolefin resin include: a propylene/1-butene/maleic anhydride copolymer, propylene/isobutene/maleic anhydride copolymer, ethylene/propylene/maleic anhydride copolymer, ethylene/propylene/1-butene/maleic anhydride copolymer and propylene/octene/maleic anhydride copolymer; among these, propylene/1-butene/maleic anhydride copolymer is preferable from the viewpoint of adhesiveness. As the acid-modified polyolefin resin, these may be used each alone, or alternatively, the copolymers having the constitutions specified in the present invention may also be used in combinations of two or more thereof.

In the acid-modified polyolefin resin of the present invention, other units different from those described above may also be included, if necessary. Examples of the other units include: (meth)acrylic acid esters such as methyl (meth)acrylate, ethyl (meth)acrylate and butyl (meth)acrylate; maleic acid esters such as dimethyl maleate, diethyl maleate and dibutyl maleate; (meth)acrylic acid amides; alkyl vinyl ethers such as methyl vinyl ether and ethyl vinyl ether; vinyl esters such as vinyl formate, vinyl acetate, vinyl propionate, vinyl pivalate and vinyl versatate, and vinyl alcohols obtained by saponification of vinyl esters with basic compounds; 2-hydroxyethyl acrylate; glycidyl (meth)acrylate; (meth)acrylonitrile; styrene; substituted styrenes; vinyl halides, vinylidene halides; carbon monoxide; and sulfur dioxide. The mixtures of these may also be used.

The content of the other unit(s) is preferably 10% by mass or less of the acid-modified polyolefin resin.

In the acid-modified polyolefin resin in the present invention, the residual content of the unreacted unsaturated carboxylic acid monomer component included in the acid-modified polyolefin resin is preferably 10,000 ppm or less, more preferably 5,000 ppm or less, furthermore preferably 1,000 ppm or less, particularly preferably 500 ppm or less and most preferably 100 ppm or less.

When the residual content of the unreacted unsaturated carboxylic acid monomer component is 10,000 ppm or less, the adhesiveness or the performances such as the adhesiveness under harsh environmental conditions tend to be improved. The residual content of the unreacted unsaturated carboxylic acid monomer component as referred to herein means the content of the unsaturated carboxylic acid monomer component, unreacted with the polyolefin resin and remaining in a free state in the acid-modified polyolefin resin, of the unsaturated carboxylic acid monomer component used as a raw material in the production of the acid-modified polyolefin resin.

The content of the unreacted unsaturated carboxylic acid monomer component included in the acid-modified polyolefin resin can be reduced before the preparation of the primer from the acid-modified polyolefin resin and a medium by, for example, the following methods: a method in which the unreacted unsaturated carboxylic acid monomer component is distilled off by heating and depressurizing the acid-modified polyolefin resin; a method in which the acid-modified polyolefin resin is dissolved in a solvent, and the unreacted unsaturated carboxylic acid monomer component is separated by reprecipitation; and a method in which the acid-modified polyolefin resin made to have a form of a powder or a pellet is washed with a liquid such as water or an organic solvent to remove the unreacted unsaturated carboxylic acid monomer component.

Among these methods, the method in which the acid-modified polyolefin resin made to have a form of a powder or a pellet is washed by using water or an organic solvent as a cleaning liquid is preferable because of being high in the reduction effect.

It is preferable to select, as the organic solvent to be used for the cleaning liquid, an organic solvent poor in the solubility for the acid-modified polyolefin resin and excellent in the solubility for the unsaturated carboxylic acid monomer component; specifically, it is preferable to use, for example, alcohols such as methanol, ethanol, propanol and butanol, and acetone.

By using an organic solvent including an organic amine added thereto as the cleaning liquid, it is possible to drastically reduce the residual content of the unsaturated carboxylic acid component. Examples of the organic amine capable of being added to the cleaning liquid include: triethylamine, N,N-dimethylethanolamine, isopropylamine, aminoethanol, dimethylaminoethanol, diethylaminoethanol, ethylamine, diethylamine, isobutylamine, dipropylamine, 3-ethoxypropylamine, 3-diethylaminopropylamine, sec-butylamine, propylamine, n-butylamine, 2-methoxyethylamine, 3-methoxypropylamine, 2,2-dimethoxyethylamine, monoethanolamine, morpholine, N-methylmorpholine, N-ethylmorpholine, pyrrole and pyridine.

The content of the organic amine in the cleaning liquid is preferably 0.5 to 30 parts by mass and more preferably 1 to 10 parts by mass in relation to 100 parts by mass of the cleaning liquid, from the viewpoint of the efficiency of the reduction of the unreacted unsaturated carboxylic acid monomer component.

Specific examples of the washing method include a method in which the acid-modified polyolefin resin made to have a form of a powder or a pellet and a cleaning liquid composed of water and an organic solvent are mixed with each other, heated and stirred. By increasing the times of the washing, the residual content can be more reduced. The amount of the cleaning liquid is preferably, in terms of mass, equal to or more than the amount of the acid-modified polyolefin resin. The washing temperature is preferably a high temperature within a range free from causing the dissolution or deformation of the resin. The washing time is preferably 30 minutes or more and more preferably 60 minutes or more. After the washing, the acid-modified polyolefin resin is preferably subjected to the drying of the cleaning liquid by, for example, heating or depressurization.

The weight average molecular weight of the acid-modified polyolefin resin in the present invention is preferably 5,000 to 200,000, more preferably 10,000 to 150,000, furthermore preferably 20,000 to 120,000, particularly preferably 30,000 to 120,000 and most preferably 40,000 to 120,000. When the weight average molecular weight of the acid-modified polyolefin resin is less than 5,000, the adhesiveness to footwear constituting members tends to be degraded; on the other hand, when weight average molecular weight of the acid-modified polyolefin resin exceeds 200,000, the processing of the form of the coating agent tends to be difficult, for example, in such a way that the dispersion or the dissolution of the resin in a medium comes to be difficult. The weight average molecular weight of the acid-modified polyolefin resin can be determined by using gel permeation chromatography (GPC) relative to polystyrene standards.

From the viewpoint of the heat resistance, the acid-modified polyolefin resin of the present invention preferably has a melting point of 60° C. or higher and preferably has a Vicat softening point temperature of 50° C. or higher.

<Medium>

The primer for footwear constituting members of the present invention includes the acid-modified polyolefin resin and a medium, the form of the primer is such that the acid-modified polyolefin resin is dispersed and/or dissolved in the medium.

Examples of the medium include an organic solvent or an aqueous medium. The aqueous medium means water or a liquid mainly composed of water, and may include the below-described basic compound(s) or an organic solvent(s).

When an organic solvent is used as the medium, an organic solvent capable of dissolving the acid-modified polyolefin resin is selected, and a solution prepared by dissolving the acid-modified polyolefin resin is preferably used as the primer for footwear constituting members, from the viewpoint of the easiness in coating.

Specific examples of the organic solvent include: halogen-based organic solvents such as perchloroethylene, trichloroethylene, methylene chloride and chloroform; and the following nonhalogen-based organic solvents: hydrocarbon compounds such as hexane, heptane and pentane; aromatic compounds such as benzene, toluene and xylene; alcohol compounds such as ethanol, 1-propanol, 2-propanol, 1-butanol and 2-butanol; ether compounds such as diethyl ether, tetrahydrofuran and t-butyl methyl ether; ketone compounds such as acetone, methyl ethyl ketone and methyl isobutyl ketone; and ester compounds such as ethyl formate, methyl acetate, ethyl acetate, propyl acetate, isopropyl acetate. The solvents may also be used in combinations of two or more thereof. Among these, from the viewpoint of the solubility for the acid-modified polyolefin resin, the hydrocarbon compounds, the aromatic compounds, the ketone compounds and the ester compounds are preferable.

A primer for footwear constituting members using an organic solvent as a medium is not required to intentionally use water as a raw material, and does not exclude the inclusion of water. The primer for footwear constituting members may contain a trace amount of water as a result of the use of a raw material(s) containing water absorbed therein. The content of water in the primer for footwear constituting members is not particularly limited, and is preferably 1% by mass or less, more preferably 0.5% by mass or less and particularly preferably 0.2% by mass or less of the whole primer for footwear constituting members.

As the method for dissolving the acid-modified polyolefin resin in an organic solvent, heretofore known methods can be adopted; specific examples of such a method include a method in which the acid-modified polyolefin resin is placed in an organic solvent, stirred and heated, if necessary. The solution of the acid-modified polyolefin resin is preferably prepared in a state of a uniform liquid.

On the other hand, when an aqueous medium is used as the medium, an aqueous dispersion of the acid-modified polyolefin resin in which the acid-modified polyolefin resin is dispersed in the aqueous medium is preferably used as the primer for footwear constituting members, from the viewpoint of the easiness in coating.

The aqueous dispersion of the acid-modified polyolefin resin using an aqueous medium is preferable from the viewpoint of the adhesiveness or the cold adhesiveness, and is also preferable from the viewpoint of the environmental preservation or the preservation of the health of workers, as compared with the solution of the acid-modified polyolefin resin using an organic solvent.

The aqueous dispersion of the acid-modified polyolefin resin is preferably prepared in a state of a uniform liquid. A uniform liquid as referred to herein means a state in which no portion different in the solid content concentration from other portions, such as precipitate, phase separation or skinning, is found in the aqueous dispersion as far as the exterior appearance of the aqueous dispersion is concerned.

The aqueous medium as referred to above means water or a liquid mainly composed of water, and may include a basic compound(s) or an organic solvent(s).

The aqueous medium in the aqueous dispersion of the present invention preferably include a basic compound(s). The carboxyl groups of the acid-modified polyolefin resin contained in the aqueous dispersion are neutralized with the basic compound, and the electric repulsion force between the produced carboxyl anions prevents the aggregation between the fine particles, and imparts stability to the aqueous dispersion. Any basic compound capable of neutralizing the carboxyl groups can be used; however, from the viewpoint of the primer properties, volatile basic compounds are preferably used.

As the basic compound, ammonia and organic amines are preferable. Specific examples of the organic amine include: triethylamine, N,N-dimethyl ethanolamine, isopropylamine, aminoethanol, dimethylaminoethanol, diethylaminoethanol, ethylamine, diethylamine, isobutylamine, dipropylamine, 3-ethoxypropylamine, 3-diethylaminopropylamine, sec-butylamine, propylamine, n-butylamine, 2-methoxyethylamine, 3-methoxypropylamine, 2,2-dimethoxyethylamine, monoethanolamine, morpholine, N-methylmorpholine, N-ethylmorpholine, pyrrole and pyridine.

The mixing amount of the basic compound is preferably 0.5 to 10 equivalents, more preferably 0.8 to 5 equivalents and particularly preferably 0.9 to 3.0 equivalents in relation to the carboxyl group in the acid-modified polyolefin resin. When the mixing amount of the basic compound is less than 0.5 equivalent, the addition effect of the basic compound is not found; on the other hand, when the mixing amount exceeds 10 equivalents, the drying time in the formation of the primer layer is sometimes elongated, or the stability of the aqueous dispersion is sometimes degraded.

The aqueous medium in the aqueous dispersion of the present invention may further include an organic solvent. The inclusion of an organic solvent allows the wettability to the footwear constituting members to be improved. Moreover, addition of an organic solvent in the below-described preparation of the aqueous dispersion of the acid-modified polyolefin resin promotes the preparation of the aqueous dispersion and allows the dispersed particle size to be made small.

The content of the organic solvent in the aqueous dispersion is preferably 50% by mass or less, more preferably 0.1 to 45% by mass, furthermore preferably 2 to 40% by mass and particularly preferably 3 to 35% by mass, in relation to the whole of the aqueous dispersion. When the content of the organic solvent exceeds 50% by mass, the stability of the aqueous dispersion is sometimes degraded.

From the viewpoint of the performance of promotion of the aqueous dispersion preparation or the dispersion stability, the organic solvent included in the aqueous dispersion has a solubility of preferably 10 g/L or more, more preferably 20 g/L or more and furthermore preferably 50 g/L or more in water at 20° C.

From the viewpoint of the drying property in the formation of the primer layer by drying the primer for footwear constituting members, the boiling point of the organic solvent included in the aqueous dispersion is preferably 200° C. or lower. The organic solvent having a boiling point higher than 200° C. tends to remain in the primer layer; in particular, in the primer layer subjected to low-temperature drying, for example, the water resistance or the adhesiveness to footwear constituting members is sometimes degraded.

Examples of the organic solvent included in the aqueous dispersion include: alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol; ketones such as methyl ethyl ketone, methyl isobutyl ketone, ethyl butyl ketone and cyclohexanone; ethers such as tetrahydrofuran and dioxane; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate and dimethyl carbonate; and glycol derivatives such as ethylene glycol monomethyl ether, ethylene glycol monoethyl ether, ethylene glycol monopropyl ether, ethylene glycol monobutyl ether and ethylene glycol ethyl ether acetate; and moreover, 1-methoxy-2-propanol, 1-ethoxy-2-propanol, 3-methoxy-3-methyl-1-butanol, methoxybutanol, acetonitrile, dimethyl formamide, dimethyl acetamide, diacetone alcohol, ethyl acetoacetate, 1,2-dimethylglycerin, 1,3-dimethylglycerin and trimethyl glycerin.

Among these, ethanol, n-propanol, isopropanol, n-butanol, methyl ethyl ketone, cyclohexanone, tetrahydrofuran, dioxane, ethylene glycol monoethyl ether, ethylene glycol monopropyl ether, ethylene glycol monobutyl ether and diethylene glycol monomethyl ether are preferable because of being more effective in promoting the preparation of the aqueous dispersion of the acid-modified polyolefin resin.

In the present invention, these organic solvents may be used as mixtures of two or more thereof.

<Aqueous Dispersion>

Next, the aqueous dispersion of the acid-modified polyolefin resin is described.

In the present invention, the acid-modified polyolefin resin dispersed in the aqueous dispersion preferably has a weight average particle size of 0.5 Mm or less; from the viewpoint of the adhesiveness or the cold adhesiveness, the weight average particle size concerned is more preferably 0.001 to 0.4 μm, furthermore preferably 0.002 to 0.2 μm, particularly preferably 0.005 to 0.15 μm and most preferably 0.01 to 0.09 μm.

The degree of dispersion (weight average particle size/ number average particle size) related to the particle size distribution of the acid-modified polyolefin resin in the aqueous dispersion is preferably 2.6 or less, more preferably 2.0 or less, furthermore preferably 1.5 or less and particularly preferably 1.3 or less. When the degree of dispersion deviates from the foregoing range, the adhesiveness or the cold adhesiveness is sometimes degraded.

In the present invention, the content of the acid-modified polyolefin resin in the aqueous dispersion can be appropriately selected according to the coating conditions, coating thickness, performances and the like without being particularly limited; however, from the viewpoint of appropriately maintaining the viscosity of the aqueous dispersion and developing satisfactory coating property, the content concerned is preferably 1 to 60% by mass, more preferably 3 to 55% by mass, furthermore preferably 5 to 50% by mass and particularly preferably 10 to 45% by mass.

The viscosity of the aqueous dispersion in the present invention is preferably, without being particularly limited to, 4 to 100000 mPa·s as measured with a B-type viscometer under a condition of 20° C. The pH of the aqueous dispersion is also preferably, without being particularly limited to, pH 6 to 12.

The aqueous dispersion in the present invention preferably does not substantially include a nonvolatile aqueous dispersing aid. The present invention does not exclude the use of a nonvolatile aqueous dispersing aid; however, without using any aqueous dispersing aid, the acid-modified polyolefin resin can be stably dispersed in an aqueous medium with the weight average particle size thereof falling in a range of 0.5 μm or less. The aqueous dispersion in the present invention substantially does not include any non-volatile aqueous dispersing aid, and accordingly is excellent in the primer properties, in particular, in the adhesiveness to footwear constituting members, water resistance and the like, and these performances are little changed over a long period of time.

Here, "the aqueous dispersing aid" means a chemical or compound added to promote the preparation of an aqueous dispersion or to stabilize the aqueous dispersion when an aqueous dispersion is produced; "nonvolatility" means that a nonvolatile substance has no boiling point under normal pressure, or a nonvolatile substance has a high boiling point (for example, 300° C. or higher) under normal pressure.

The statement that "an aqueous dispersion substantially does not include any nonvolatile aqueous dispersing aid" means that such an aid as described above is not used in the production (the preparation of the aqueous dispersion of the acid-modified polyolefin resin), and consequently the resulting aqueous dispersion does not contain the aid concerned. Accordingly, the content of such an aqueous dispersing aid as described above is particularly preferably zero; however, within a range not impairing the advantageous effects of the present invention, such an aqueous dispersing aid may be included in a content of 5% by mass or less, preferably 2% by mass or less and more preferably approximately less than 0.5% by mass in relation to the acid-modified polyolefin resin component.

Examples of the nonvolatile aqueous dispersing aid as referred to in the present invention include: emulsifiers described below, compounds having a protective colloid function, modified waxes, high-acid-number acid-modified compounds and water-soluble polymers.

Examples of the emulsifiers include: cationic emulsifiers, anionic emulsifiers, nonionic emulsifiers and amphoteric emulsifiers; and surfactants in addition to the emulsifiers generally used for emulsion polymerization. Examples of the anionic emulsifiers include: sulfuric acid ester salts of higher alcohols, higher alkylsulfonic acid salts, higher carboxylic acid salts, alkylbenzenesulfonic acid salts, polyoxyethylene alkylsulfate salts, polyoxyethylene alkyl phenyl ether sulfate salts and vinyl sulfosuccinate. Examples of the nonionic emulsifiers include: compounds having polyoxyethylene structure such as polyoxyethylene alkyl ether, polyoxyethylene alkyl phenyl ether, polyethylene glycol fatty acid ester, ethylene oxide-propylene oxide block copolymer, polyoxyethylene fatty acid amide and ethylene oxide-propylene oxide copolymer; and sorbitan derivatives such as polyoxyethylene sorbitan fatty acid ester. Examples of the amphoteric emulsifiers include: lauryl betaine and lauryl dimethyl amine oxide.

Examples of the compounds having a protective colloid function, modified waxes, high-acid-number acid-modified compounds and water-soluble polymers include compounds generally used as the dispersion stabilizers for fine particles such as: polyvinyl alcohol; carboxyl group-modified polyvinyl alcohol; carboxymethyl cellulose; hydroxyethyl cellulose; hydroxypropyl cellulose; modified starch; polyvinylpyrrolidone; polyacrylic acid and salts thereof; acid-modified polyolefin waxes usually having a number average molecular weight of 5000 or less such as carboxyl group-containing polyethylene wax, carboxyl group-containing polypropylene wax and carboxyl group-containing polyethylene-propylene wax and the salts of these waxes; acrylic acid-maleic anhydride copolymer and the salts thereof; carboxyl group-containing polymers having an unsaturated carboxylic acid content of 10% by mass or more such as styrene-(meth)acrylic acid copolymer, ethylene-(meth) acrylic acid copolymer, isobutylene-maleic anhydride alternating copolymer and (meth)acrylic acid-(meth)acrylic acid ester copolymer, and the salts of these polymers; polyitaconic acid and the salts thereof; water-soluble acrylic copolymers having amino groups; gelatin; gum arabic; and casein.

<Method for Producing Aqueous Dispersion>

Next, the method for producing the aqueous dispersion in the present invention is described.

As a method for producing the aqueous dispersion in the present invention, for example, a method can be used in which the acid-modified polyolefin resin and an aqueous medium (for example, an organic solvent or a basic compound is included, if necessary) are heated and stirred in a hermetically sealable vessel.

As an apparatus used for the preparation of an aqueous dispersion, vessels used as a solid/liquid stirring apparatus or an emulsifying apparatus can be used, and it is preferable to use an apparatus capable of being pressurized to 0.1 MPa or more. The stirring method and the stirring rotation speed are not particularly limited; the stirring may be a low speed stirring that allows the acid-modified polyolefin resin to be in a suspended state in the aqueous medium. Accordingly, the use of a high speed stirring (for example, 1000 rpm or more) or a homogenizer is not required; even with a simple apparatus, the aqueous dispersion can be produced.

In the above-described apparatus, the raw materials such as the acid-modified polyolefin resin, a basic compound, an organic solvent and water are placed, and are mixed under stirring preferably at a temperature of 40° C. or lower. Subsequently, the stirring is continued (for example, for 5 to 300 minutes) preferably until coarse particles disappear while the temperature inside the vessel is being maintained at 80 to 240° C., preferably at 100 to 220° C., furthermore preferably at 110 to 200° C. and particularly preferably at 100 to 190° C.

In the steps so far, the acid-modified polyolefin resin in a state of being dispersed in an aqueous medium is obtained. However, in the present invention, for the purpose of making more satisfactory the preparation of the dispersion of the acid-modified polyolefin resin and allowing the weight average particle size of the acid-modified polyolefin resin to fall within a preferable range specified in the present invention, subsequently at least one selected from the basic compound, the organic solvent and water is added to the system, the resulting mixture is preferably heated under stirring in the hermetically sealed vessel, again at a temperature of 80 to 240° C. In this way, the addition of a component(s) constituting the aqueous medium and the heating under stirring performed again allow the degree of dispersion associated with the weight average particle size and the particle size distribution of the acid-modified polyolefin resin in the aqueous dispersion to be regulated so as to fall within a preferable range.

The method for additionally mixing the basic compound, the organic solvent or water is not particularly limited; examples of the method concerned include: a method in which the additional mixing is performed under a pressurized condition by using, for example, a gear pump; and a method in which the temperature inside the system is once decreased so as for the system to reach normal pressure and then the additional mixing is performed.

In the additional mixing, the proportions of the basic compound, the organic solvent and water may be appropriately determined according to, for example, the intended solid content concentration, the intended particle size and the intended degree of dispersion. The total content of the basic compound, the organic solvent and water is regulated in such a way that the solid content concentration after mixing is preferably 1 to 50% by mass, more preferably 2 to 45% by mass and particularly preferably 3 to 40% by mass.

In the above-described step, when the temperature inside the vessel is lower than 80° C., the preparation of the aqueous dispersion of the acid-modified polyolefin resin is made to hardly proceed; on the other hand, when the temperature inside the vessel exceeds 240° C., the molecular weight of the acid-modified polyolefin resin is sometimes decreased.

When the organic solvent is used in the production of the aqueous dispersion, after the preparation of the aqueous dispersion the organic solvent may be partially or wholly distilled off outside the system by a solvent-removing treatment generally referred to as "stripping" to reduce the content of the organic solvent. From the viewpoint of the stability of the aqueous dispersion, the content of the organic solvent in the aqueous dispersion is preferably reduced by stripping to be 50% by mass or less.

In the step of stripping, the organic solvent used in the preparation of the aqueous dispersion can be substantially completely distilled off. However, for the purpose of substantially completely distilling off the organic solvent, the degree of pressure reduction in the apparatus is required to be enhanced, or the operation time is required to be elongated; in consideration of the productivity, the lower limit of the organic solvent content is preferably approximately 0.01% by mass.

Examples of the stripping method include a method in which the aqueous dispersion is heated while being stirred under normal pressure or reduced pressure to distill off the organic solvent. The distilling off the aqueous medium increases the solid content concentration, and hence, for example, when the viscosity is increased to degrade the workability, water may be beforehand added to the aqueous dispersion.

The solid content concentration of the aqueous dispersion can be regulated by distilling off the organic solvent by such stripping as described above, or diluting the aqueous dispersion with the aqueous medium.

The above-described method enables the preparation of the aqueous dispersion of the acid-modified polyolefin resin almost or completely without leaving any undispersed resin in the aqueous medium. However, in order to remove foreign substances or a small amount of undispersed resin in the vessel, a filtration step may be provided when the aqueous dispersion is discharged from the apparatus. The filtration method is not limited; however, example of such a method includes a method in which the aqueous dispersion is filtered under pressure (for example, air pressure: 0.5 MPa) with a 300-mesh stainless steel filter (wire diameter: 0.035 mm, plain weave). The provision of such a filtration step enables the removal of foreign substances or undispersed resin even when the foreign substances or the undispersed resin is found, and consequently allows the obtained aqueous dispersion to be used as the primer for footwear constituting members without causing any troubles.

<Additives>

To the primer for footwear constituting members of the present invention, for the purpose of further improving the performances thereof according to the intended purposes, for example, a cross-linking agent, resins other than the acid-modified polyolefin (herein after, sometimes referred to as "other resins"), an inorganic particle, a pigment and a dye can be added.

As the cross-linking agent to be added to the primer for footwear constituting members of the present invention, for example, the following can be used: a cross-linking agent having a self-cross-linkability, a cross-linking agent having in the molecule thereof a plurality of functional groups capable of reacting with a carboxyl group, and a metal complex having polyvalent coordination positions.

Specific examples of such cross-linking agents include: oxazoline-based cross-linking agents, isocyanate-based cross-linking agents (inclusive of block type), amine-based cross-linking agents, carbodiimide-based cross-linking agents, melamine-based cross-linking agents, urea-based cross-linking agents, epoxy-based cross-linking agents, zirconium salt compounds, silane coupling agents and organic peroxides.

Among these, the cross-linking agent having in the molecule thereof a plurality of functional groups capable of reacting with carboxyl groups is more preferable. Examples of such a cross-linking agent include: oxazoline-based cross-linking agents, epoxy-based cross-linking agents, carbodiimide-based cross-linking agents, isocyanate-based cross-linking agents, amine-based cross-linking agents and melamine-based cross-linking agents. Among these, oxazoline-based cross-linking agents, isocyanate-based cross-linking agents, amine-based cross-linking agents, carbodiimide-based cross-linking agents are preferable because of the adhesiveness improvement and the retention of cold adhesiveness, and isocyanate-based cross-linking agents, amine-based cross-linking agents and epoxy-based cross-linking agents are particularly preferable.

These cross-linking agents may be used in combinations of two or more thereof. The cross-linking agents may be either low molecular weight compounds or polymer-type cross-linking agents.

The addition amount of the cross-linking agent is preferably 0.1 to 30 parts by mass, more preferably 0.2 to 20 parts by mass and furthermore preferably 0.5 to 15 parts by mass in relation to 100 parts by mass of the acid-modified polyolefin resin of the primer for footwear constituting members, from the viewpoint of sufficient formation of the cross-linked structure.

Examples of the other resins to be added to the primer for footwear constituting members of the present invention include: polyvinyl acetate, ethylene-vinyl acetate copolymer, polyvinyl chloride, polyvinylidene chloride, ethylene-(meth)acrylic acid copolymer, ethylene-(meth)acrylic acid ester-maleic anhydride copolymer, styrene-maleic acid resin, styrene-butadiene resin, butadiene resin, acrylonitrile-butadiene resin, poly(meth)acrylonitrile resin, (meth)acrylamide resin, chlorinated polyethylene resin, chlorinated polypropylene resin, polyester resin, modified nylon resin, polyurethane resin, rosin-based and terpene-based tackifier resins, phenolic resin, silicone resin and epoxy resin. Mixtures of two or more of these other resins may also be used, if necessary. Among these, polyurethane resin is preferable from the viewpoint of more improving the adhesiveness.

From the viewpoint of the adhesiveness, the addition amount of the other resin(s) is preferably 5 to 300 parts by mass, more preferably 5 to 200 parts by mass, furthermore preferably 10 to 150 parts by mass and particularly preferably 20 to 100 parts by mass, in relation to 100 parts by mass of the acid-modified polyolefin resin of the primer for footwear constituting members.

The polyurethane resin preferably added as the other resin to the primer for footwear constituting members of the present invention is a polymer having in the main chain thereof the urethane bonds, and is, for example, a polymer obtained by the reaction between a polyol compound and a polyisocyanate compound.

The polyurethane resin preferably has anionic groups from the viewpoint of the adhesiveness and the dispersibility in an aqueous medium. The anionic group means a functional group to be an anion in the aqueous medium; examples of such a group include a carboxyl group, a sulfonate group, a sulfate group and a phosphate group. The polyurethane resin preferably has a carboxyl group among these groups.

Examples of the polyol component constituting the polyurethane resin include, without being particularly limited to: water; low molecular weight glycols such as ethylene glycol, diethylene glycol, triethylene glycol, 1,3-butanediol, 1,4-butanediol, 1,2-propanediol, 1,3-propanediol, 1,6-hexanediol, neopentyl glycol, 1,4-cyclohexanedimethanol, methyl-1,5-pentanediol, 1,8-octanediol, 2-ethyl-1,3-hexanediol, diethylene glycol, triethylene glycol and dipropylene glycol; low molecular weight polyols such as trimethylolpropane, glycerin and pentaerythritol; polyol compounds having the ethylene oxide unit or the propylene oxide unit; high molecular weight diols such as polyether diols and polyester diols; bisphenols such as bisphenol A and bisphenol F; and dimer diol prepared by converting the carboxyl groups of dimer acid into hydroxyl groups.

As the polyisocyanate component constituting the polyurethane resin, one or mixtures of two or more of heretofore known aromatic, aliphatic and alicyclic diisocyanates can be used. Specific examples of the diisocyanates include: tolylene diisocyanate, 4,4'-diphenylmethane diisocyanate, 1,3-phenylene diisocyanate, hexamethylene diisocyanate, xylylene diisocyanate, 1,5-naphthylene diisocyanate, isophorone diisocyanate, dimeryl diisocyanate, lysine diisocyanate, hydrogenated 4,4'-diphenylmethane diisocyanate, hydrogenated tolylene diisocyanate, dimer diisocyanate obtained by converting carboxyl groups of dimeric acid into isocyanate groups, and adducts, biurets and isocyanurates of these diisocyanate compounds. For the diisocyanates, tri- or higher-functional polyisocyanates such as triphenylmethane triisocyanate, polymethylene polyphenyl isocyanate may also be used. Among these, from the viewpoint of the adhesiveness improvement, the isocyanate component is preferably isophorone diisocyanate.

For the purpose of introducing anionic groups into the polyurethane resin, a polyol component having carboxyl groups, sulfonate groups, sulfate groups, phosphate groups and the like may be used; examples of the polyol compound having carboxyl groups include: 3,5-dihydroxybenzoic acid, 2,2-bis(hydroxymethyl)propionic acid, 2,2-bis(hydroxyethyl)propionic acid, 2,2-bis(hydroxypropyl)propionic acid, bis(hydroxymethyl)acetic acid, bis(4-hydroxyphenyl)acetic acid, 2,2-bis(4-hydroxyphenyl)pentanoic acid, tartaric acid, N,N-dihydroxyethylglycine and N,N-bis(2-hydroxyethyl)-3-carboxyl-propionamide.

The molecular weight of the polyurethane resin can also be appropriately regulated by using a chain extender. Examples of the chain extender include those compounds each having two or more active hydrogen atoms of amino groups and hydroxyl groups, capable of reacting with isocyanate groups; for example, as such compounds, diamine compounds, dihydrazide compounds and glycols can be used.

Examples of the diamine compound include: ethylenediamine, propylenediamine, hexamethylenediamine, triethyltetramine, diethylenetriamine, isophoronediamine and dicyclohexylmethane-4,4'-diamine. Additionally, examples of the diamine compound also include: hydroxyl group-containing diamines such as N-2-hydroxyethylethylenediamine and N-3-hydroxypropylethylenediamine; and dimer diamine obtained by converting the carboxyl groups of dimeric acid into amino groups. Moreover, examples of the diamine compound also include: diamine-type amino acids such as glutamic acid, asparagine, lysine, diaminopropionic acid, ornithine, diaminobenzoic acid and diaminobenzenesulfonic acid.

Examples of the dihydrazide compound include: saturated aliphatic dihydrazides having 2 to 18 carbon atoms such as oxalic acid dihydrazide, malonic acid dihydrazide, succinic acid dihydrazide, glutaric acid dihydrazide, adipic acid dihydrazide and sebacic acid dihydrazide; unsaturated dihydrazides such as maleic acid dihydrazide, fumaric acid dihydrazide, itaconic acid dihydrazide and phthalic acid dihydrazide; and carbonic acid dihydrazide, carbodihydrazide and thiocarbodihydrazide.

As the glycols, glycols appropriately selected from the forgoing polyols can be used.

As the polyurethane resin, from the viewpoint of the adhesiveness, polycarbonate type polyurethane resins, polyether type polyurethane resin or polyester type polyurethane resins are preferable; polycarbonate type polyurethane resins and polyether type polyurethane resins are more preferably; and polyether type polyurethane resins are particularly preferable.

The polyurethane resin in the present invention is utilized as the below-described coating agent in which the polyurethane resin is dispersed and/or dissolved in a medium, and the polyurethane resin may be either of a two-component type or of a one-component type. However, the polyurethane resin is preferably of one-component type from the viewpoint of being long in pot life and excellent in the workability at the time of use.

The two-component type polyurethane resin means a polyurethane resin which is used as a mixture prepared immediately before use (at most about 12 hours before use) from the viewpoint of the pot life, by mixing a base resin mainly composed of a polyol component and a curing agent mainly composed of an isocyanate component, and is a type which forms a film through the reaction between the polyol component in the base resin and the isocyanate component in the curing agent, the reaction occurring as the medium evaporates.

The one-component type polyurethane resin means a polyurethane resin having a long pot life and being free from the need of mixing of a plurality of components immediately before use, and is a type which forms a film even only through the evaporation of the medium.

Examples of the inorganic particles to be added to the primer for footwear constituting members of the present invention include: inorganic particles of metal oxides such as magnesium oxide, zinc oxide and tin oxide and inorganic particles of calcium carbonate and silica; and layered inorganic compounds such as vermiculite, montmorillonite, hectorite, hydrotalcite and synthetic mica. The average particle sizes of these inorganic particles are preferably 0.005 to 10 μm and more preferably 0.005 to 5 μm, from the viewpoint of the stability of the aqueous dispersion. As inorganic particles, a plurality of types of inorganic particles may be used as mixtures. Zinc oxide is used for the purpose of screening ultraviolet ray, and tin oxide is used for the purpose of preventing electrostatic charging.

Examples of the pigment and the dye to be added to the primer for footwear constituting members of the present invention include titanium oxide, zinc oxide and carbon black; any of dispersion dyes, acid dyes, cationic dyes and reactive dyes can be used.

To the primer for footwear constituting members of the present invention, various chemicals such as a leveling agent, an antifoaming agent, a foaming preventing agent, a pigment dispersant, an ultraviolet absorber, a thickening agent, a weathering agent and a flame retardant can also be further added if necessary. These may be used each alone or in combinations of two or more thereof.

<Method for Using Primer for Footwear Constituting Members>

Next, a method for using the primer for footwear constituting members of the present invention is described.

First, by using the primer for footwear constituting members of the present invention, a primer layer is laminated on the surface of a footwear constituting member. Specifically, a heretofore known pretreatment such as degreasing or buffing is preliminarily applied, if necessary, to the whole or a part of the surface of the footwear constituting member, then the surface concerned is coated in a thickness as uniform as possible with the primer for footwear constituting members, the applied primer is subjected to setting at around room temperature if necessary, the medium contained in the primer for footwear constituting members is dried to evaporate a fraction or the whole of the medium, and thus a primer layer is laminated on the surface of the footwear constituting member. The resulting primer layer is subjected to various treatments such as baking if necessary.

The primer for footwear constituting members of the present invention can be used for coating by heretofore known methods. Examples of the coating method include the following methods: brush coating, writing or paint brush coating, knife coating, spray coating, dip coating, lip coating, curtain flow coating, gravure roll coating, reverse roll coating and wire bar coating. Among these methods, the methods such as brush coating and writing or paint brush coating suitable for production of footwear are preferable.

The coating amount of the primer for footwear constituting members of the present invention on the surface of the footwear constituting member is, in terms of the primer layer after drying, preferably 0.1 to 300 g/m$^2$, more preferably 1 to 200 g/m$^2$, furthermore preferably 5 to 100 g/m$^2$ and particularly preferably 10 to 80 g/m$^2$. When the coating amount deviates from the foregoing range, the effect as a primer tends to be degraded.

For the purpose of regulating the coating amount, in addition to appropriate selection of the coating method or the coating conditions, it is preferable to use a primer for footwear constituting members regulated so as to have a concentration corresponding to the intended coating amount. The concentration of the primer for footwear constituting members may be regulated by the fed composition at the time of preparation, or may also be regulated by appropriately diluting or concentrating, by a method such as stripping, a once prepared primer for footwear constituting members.

For drying or baking after coating, a heretofore known apparatus such as a hot air dryer or an infrared heater can be used.

The temperature or the time for drying is appropriately selected according to the properties of the footwear constituting member as a matter to be coated, or the properties or the mixing amounts of various materials such as the foregoing cross-linking agent, which can be optionally mixed in the primer for footwear constituting members. The drying temperature is preferably 30 to 150° C., more preferably 40 to 100° C. and furthermore preferably 50 to 80° C. The drying time is preferably 1 to 60 minutes, more preferably 3 to 30 minutes and furthermore preferably 5 to 20 minutes.

By the above-described method, there is obtained a footwear constituting member having a primer layer laminated on at least a part of the surface thereof.

Next, a method for allowing the footwear constituting member having a laminated primer layer to adhere to another footwear constituting member (another adherend to which the footwear constituting member is made to adhere, and hereinafter, sometimes referred to as "a counterpart member") is described.

Also in the case of the counterpart member, it is preferable to apply a surface treatment such as degreasing, buffing or primer coating, suitable for the material of the counterpart member. When the primer for footwear constituting members of the present invention can also be applied to the counterpart member, it is preferable to laminate a primer layer also on the surface of the counterpart member by coating the surface concerned with the primer for footwear constituting members of the present invention.

In the present invention, the primer layer on the surface of the footwear constituting member is coated with an adhesive and dried to form an adhesive layer, and the footwear constituting member is allowed to adhere to the counterpart member through the intermediary of the adhesive layer by the adhesive force of the adhesive layer.

As the adhesive, a heretofore known footwear adhesive such as a urethane-based adhesive or a chloroprene-based adhesive can be used, and a solvent-based adhesive or an aqueous adhesive can also be used.

Among these, the urethane-based adhesive has excellent adhesiveness. As the urethane-based adhesive, one-component type and two-component curable type urethane-based adhesives are available, and the two-component curable type urethane-based adhesives are preferable from the viewpoint of adhesiveness.

Examples of the two-component curable type urethane-based adhesives include an adhesive used by mixing a liquid containing a polyol compound and a liquid containing a polyisocyanate. The methods for using these adhesives can adopt heretofore known methods. Specifically, for example, the surface of the footwear constituting member of the present invention with the primer layer provided on the surface is coated with a solvent-type two-component curable urethane-based adhesive by brush coating in such a way that the amount of the adhesive layer after drying is preferably 20 to 200 g/m$^2$ and more preferably 50 to 150 g/m$^2$. The surface of the counterpart member is also coated with the same adhesive in the same manner as in the case of the foregoing footwear constituting member. The drying temperature after coating is preferably 40 to 120° C. and more preferably 50 to 100° C., the drying time after coating is preferably 1 to 30 minutes and more preferably 10 to 20 minutes. The adhesive is dried under the foregoing conditions to form an adhesive layer. Subsequently, under the condition that the temperature of the adhesive layer heated by drying is maintained preferably at 30° C. or higher and more preferably at 40° C. or higher, the adhesive layer provided on the footwear constituting member and the adhesive layer provided on the counterpart member are bonded to each other, and are allowed to adhere to each other by pressure bonding preferably with a degree of pressure such that the footwear constituting member and the counterpart member are not deformed.

A set of footwear including the footwear constituting member of the present invention can be obtained by allowing the footwear constituting member, having the laminated primer layer, of the present invention and the counterpart member to adhere to each other in the above-described manner and by further processing the footwear constituting member and the counterpart member adhering to each other.

Examples of the footwear constituting member to which the primer for footwear constituting members of the present invention is applied include, without being particularly limited to: members mainly constituting the sole of a shoe such as the cushoning members provided in the outersole, midsole, insole and sole, and shank.

The material of the footwear constituting member is preferably a material giving an adhesion strength, developing a satisfactory adhesiveness of 20 N/20 mm or more, between the footwear constituting member and the counterpart member allowed to adhere to each other by using the primer for footwear constituting members.

The material of the footwear constituting member is not particularly limited, but, is preferably a material made of a polyolefin-based resin and more preferably a material made of a polypropylene-based resin from the viewpoint of the adhesiveness. In the present invention, a material made of a polyolefin-based resin means a material including as the constituent material thereof at least a polyolefin resin or a polyolefin copolymer, and such materials may be made of the polyolefin resin alone or the polyolefin copolymer alone, or may be a material including as blended therewith the resins and components other than the polyolefin resin and the polyolefin copolymer. A material made of a polypropylene-based resin means a material including as the constituent material thereof at least a polypropylene resin or a polypropylene copolymer, and such materials may be made of the polypropylene resin alone or the polypropylene copolymer alone, or may be a material including as blended therewith the resins and components other than the polypropylene resin and the polypropylene copolymer.

A set of footwear of the present invention obtained by using the primer for footwear constituting members of the present invention and by the foregoing adhesion method and the like is excellent in the adhesiveness between the footwear constituting member and the counterpart member. The strength (adhesion strength) required to peel the footwear constituting member and the counterpart member allowed to adhere to each other through the intermediary of the primer layer and the adhesive layer is varied depending on the function, material, shape or the like of the footwear constituting member, but is usually preferably 20 N/20 mm or more, more preferably 30 N/20 mm or more, furthermore preferably 40 N/20 mm or more and particularly preferably 60 N/20 mm or more; the occurrence of the breakage of the footwear constituting member during the measurement is most preferable. When the breakage of the members occurs during the measurement, the adhesion strength is varied depending on the types of the broken members, but can be regarded to exceed 100 N/20 mm.

The footwear constituting member and the counterpart member allowed to adhere to each other through the intermediary of the primer for footwear constituting members of the present invention and the adhesive layer retain satisfactory adhesiveness even when used at a subfreezing temperature, and even when used in a harsh temperature or humidity environment for a long period of time. The adhesion strength after the use in such conditions as described above is preferably 20 N/20 mm or more, more preferably 30 N/20 mm or more, particularly preferably 40 N/20 mm or more and furthermore preferably 60 N/20 mm or more; the occurrence of the breakage of the footwear constituting member during the measurement is most preferable.

The primer of the present invention capable of allowing the footwear constituting member to adhere with the above-described strength is suitable as the primer for footwear constituting members.

EXAMPLES

Hereinafter, the present invention is specifically described with reference to Examples. However, the present invention is not limited by these Examples.

Various properties were measured or evaluated by the following methods.

1. Properties of Acid-Modified Polyolefin Resin (1) Content of Unsaturated Carboxylic Acid Unit The content of the unsaturated carboxylic acid unit in relation to the total amount of the propylene unit (A) and the olefin unit (B) other than the propylene unit was determined by an infrared absorption spectrum analysis (Perkin Elmer System-2000 Fourier Transformation Infrared Spectrophotometer, resolution: 4 $cm^{-1}$).

(2) Constitution of Resin Other than Unsaturated Carboxylic Acid Unit

The mass ratio between the propylene unit (A) and the olefin unit (B) other than the propylene unit was determined by performing $^1$H-NMR and $^{13}$C-NMR analyses (Varian, Inc., 300 MHz) in ortho-dichlorobenzene ($d_4$) at 120° C. In the $^{13}$C-NMR analysis, measurement was performed by the gated decoupling method considering quantitativity.

(3) Weight Average Molecular Weight

A GPC analysis (HLC-8020, manufactured by Tosoh Corp., column: TSK-GEL) was performed. A sample was dissolved in tetrahydrofuran, and measured under a condition of 40° C. From the calibration curve prepared with polystyrene standard samples, the weight average molecular weight of the sample was obtained. When the sample was hardly dissolved in tetrahydrofuran, ortho-dichlorobenzene was used in place of tetrahydrofuran.

(4) Residual Content of Unreacted Unsaturated Carboxylic Acid Monomer Component

Approximately 0.05 g of an acid-modified polyolefin resin pellet was weighed precisely, 20 ml of methanol was used as an extraction solvent, and the unreacted unsaturated carboxylic acid monomer component was extracted by continuous inversion mixing at room temperature for 21 hours. The filtrate obtained by filtering the extract with a disk filter (pore size: 0.45 μm) was quantitatively analyzed with a high-performance liquid chromatography (HP1100, manufactured by Hewlett Packard Corp., column: Puresil manufactured by Waters Corp., 5 μ, C18, 120 Å, ϕ4.6 mm×250 mm (40° C.)).

When the residual content of the unreacted unsaturated carboxylic acid monomer component is less than 1000 ppm, the amount of the acid-modified polyolefin resin pellet was altered to 0.5 g, and a quantitative analysis was performed in the same manner as described above.

A calibration curve was prepared by using the standard samples of the unsaturated carboxylic acid monomer component, each having a known concentration.

(5) Melting Point

Melting points were measured by using the DSC7 manufactured by Perkin-Elmer Corp., on the basis of the DSC method.

(6) Vicat Softening Point Temperature

Vicat softening point temperatures were measured according to the method described in ASTM D1525.

2. Properties of Aqueous Dispersion (1) Number Average Particle Size, Weight Average Particle Size, and Degree of Dispersion Associated with Particle Size Distribution of Resin Particles By using the Microtrac Particle Size Distribution Analyzer UPA150 (Model No. 9340) manufactured by Nikkiso Co., Ltd., number average particle sizes (mn) and weight average particle sizes (mw) were measured. The refractive index of the resin was taken to be 1.5.

The degree of dispersion associated with the particle size distribution was calculated on the basis of the following formula:

Degree of dispersion=weight average particle size (mw)/number average particle size (mn)

3. Properties of Primer (1) Adhesiveness (Adhesion Strength)

By the following methods (a) to (e), specimens in which various materials capable being footwear constituting members were made to adhere to each other, and then the strength (adhesion strength) required for peeling the footwear constituting member and the counterpart member from each other in each of the specimens was measured by using a tensile tester (Intesco Precision Universal Material Tester, Model 2020, manufactured by Intesco Co., Ltd.) under the conditions of a tensile rate of 50 mm/min, 180° peel and 25°

C. The measurement was performed with the number of samples of 5, and the average value of the resulting five values was taken as the adhesion strength, with which the adhesiveness was evaluated. The rubber and EVA (ethylene/vinyl acetate copolymer) used in the methods (a) to (e) are the materials commonly used as the footwear constituting members such as outer soles and mid soles for footwear.

(a) Preparation of Polypropylene Resin (PP)/Rubber Specimen

One surface of a polypropylene resin (hereinafter, sometimes referred to as "PP") sheet (size: 100 mm×50 mm×3 mm in thickness), the surfaces of which were degreased with acetone, was coated with the primer for footwear constituting members by using a brush so as for the amount of the primer layer after drying to be 50 g/m$^2$, and dried with a hot air dryer at 60° C. for 20 minutes to yield a footwear constituting member including a primer layer laminated thereon.

Next, as a counterpart member, a rubber sheet made of a styrene-butadiene rubber [size: 100 mm×50 mm×2 mm in thickness; one surface was subjected to buffing; to the buffed surface, a primer for rubber primer (P-740, urethane primer, having performances as a primer for EVA, manufactured by No-tape Industrial Co., Ltd.) was applied and dried; hereinafter, referred to as "the SBR sheet"] was prepared.

Each of the primer layer surface of the footwear constituting member and the primer surface of the counterpart member was coated with a solvent-type 2-component curable urethane-based adhesive (as a polyol compound-containing liquid, DB-1900 manufactured by Diabond Industry Co., Ltd was used, as a polyisocyanate-containing liquid, Desmodur RE manufactured by Sumika Bayer Urethane Co., Ltd. was used, and these were mixed so as to give DB-1900/Desmodur RE=100/1 (mass ratio); hereinafter, sometimes the 2-component curable urethane-based adhesive is referred to as "PU") by using a brush so as for the amount of the adhesive layer after drying to be 120 g/m$^2$, and then dried with a hot air dryer at 60° C. for 20 minutes, so as for an adhesive layer to be laminated thereon.

After drying, the adhesive layer of the footwear constituting member and the adhesive layer of the counterpart member were quickly bonded to each other, and the footwear constituting member and the counterpart member were pressure bonded to each other for 20 seconds with a press machine applying a pressure of 0.1 MPa. Thus, an adhesive structure in which a PP sheet, namely the footwear constituting member and a rubber sheet, namely the counterpart member were made to adhere to each other was obtained. The adhesive structure was allowed to stand still at room temperature for 24 hours, and then cut in a width of 20 mm to prepare a specimen of 20 mm in width and 100 mm in length.

Only in the case of the preparation of the specimen for the evaluation of Example 17, a solvent-type 2-component curable chloroprene-based adhesive (prepared by using No-tape 9360 manufactured by No-tape Industrial Co., Ltd. and Desmodur RE manufactured by Sumika Bayer Urethane Co., Ltd., and by mixing these with a ratio of No-tape 9360/Desmodur RE=100/1 (mass ratio); hereinafter, sometimes the 2-component curable chloroprene-based adhesive is referred to as "CR") was used as an adhesive in place of PU.

(b) Preparation of Polyethylene Resin (PE)/Rubber Specimen

One surface of a polyethylene resin (hereinafter, referred to as "PE") sheet (size: 100 mm×50 mm×3 mm in thickness), the surfaces of which were degreased with acetone, was coated with the primer for footwear constituting members by using a brush so as for the amount of the primer layer after drying to be 50 g/m$^2$, and dried with a hot air dryer at 60° C. for 20 minutes to yield a footwear constituting member including a primer layer laminated thereon.

Next, as a counterpart member, a SBR sheet was prepared.

Each of the primer layer surface of the footwear constituting member and the primer surface of the counterpart member was coated with PU by using a brush so as for the amount of the adhesive layer after drying to be 120 g/m$^2$, and then dried with a hot air dryer at 60° C. for 20 minutes, so as for an adhesive layer to be laminated thereon.

After drying, the adhesive layer of the footwear constituting member and the adhesive layer of the counterpart member were quickly bonded to each other, and the footwear constituting member and the counterpart member were pressure bonded to each other for 20 seconds with a press machine applying a pressure of 0.1 MPa. Thus, an adhesive structure in which a PE sheet, namely the footwear constituting member and a rubber sheet, namely the counterpart member were made to adhere to each other was obtained. The adhesive structure was allowed to stand still at room temperature for 24 hours, and then cut in a width of 20 mm to prepare a specimen of 20 mm in width and 100 mm in length.

Only in the case of the preparation of the specimen for the evaluation of Example 17, CR was used as an adhesive in place of PU.

(c) Preparation of Polypropylene-Based Resin (blend 1)/Rubber Specimen

A PP pellet and a styrene-based elastomer pellet (Clayton FG1901X, manufactured by Clayton Polymer Japan Co., Ltd., a maleic acid-modified styrene-ethylene-butylene-styrene block copolymer, hereinafter referred to as "M-SEBS") were fed in a mass ratio (PP/M-SEBS) of 50/50 to a twin screw extruder set at 220° C., and melt-kneaded to yield a pellet of a polypropylene-based resin (hereinafter, referred to as "the blend 1"). The pellet of the blend 1 was pressed with a heat press machine set at 220° C. to prepare a 3-mm-thick sheet, and the sheet was processed into a sheet having a size of 100 mm×50 mm×3 mm. One surface of the processed sheet was degreased with acetone. Next, the degreased surface of the blend 1 sheet was coated with the primer for footwear constituting members by using a brush so as for the amount of the primer layer after drying to be 50 g/m$^2$, and dried with a hot air dryer at 60° C. for 20 minutes to yield a footwear constituting member including a primer layer laminated thereon.

Next, as a counterpart member, a SBR sheet was prepared.

Each of the primer layer surface of the footwear constituting member and the primer surface of the counterpart member was coated with PU by using a brush so as for the amount of the adhesive layer after drying to be 120 g/m$^2$, and then dried with a hot air dryer at 60° C. for 20 minutes, so as for an adhesive layer to be laminated thereon.

After drying, the adhesive layer of the footwear constituting member and the adhesive layer of the counterpart member were quickly bonded to each other, and the footwear constituting member and the counterpart member were pressure bonded to each other for 20 seconds with a press machine applying a pressure of 0.1 MPa. Thus, an adhesive structure in which a blend 1 sheet, namely the footwear constituting member and a rubber sheet, namely the counterpart member were made to adhere to each other was obtained. The adhesive structure was allowed to stand still at room temperature for 24 hours, and then cut in a width of 20 mm to prepare a specimen of 20 mm in width and 100 mm in length.

Only in the case of the preparation of the specimen for the evaluation of Example 17, CR was used as an adhesive in place of PU.

(d) Preparation of Polypropylene-Based Resin (Blend 2)/Rubber Specimen

A pellet of a propylene-1-butene-ethylene random copolymer (mass ratio: propylene/1-butene/ethylene=65/25/10, hereinafter referred to as "PO") and M-SEBS were fed in a mass ratio (PO/M-SEBS) of 50/50 to a twin screw extruder set at 200° C., and melt-kneaded to yield a pellet of a polypropylene-based resin (hereinafter, referred to as "the blend 2"). The pellet of the blend 2 was pressed with a heat press machine set at 200° C. to prepare a 3-mm-thick sheet, and the sheet was processed into a sheet having a size of 100 mm×50 mm×3 mm. One surface of the processed sheet was degreased with acetone. Next, the degreased surface of the blend 2 sheet was coated with the primer for footwear constituting members by using a brush so as for the amount of the primer layer after drying to be 50 g/m$^2$, and dried with a hot air dryer at 60° C. for 20 minutes to yield a footwear constituting member including a primer layer laminated thereon.

Next, as a counterpart member, a SBR sheet was prepared.

Each of the primer layer surface of the footwear constituting member and the primer surface of the counterpart member was coated with PU by using a brush so as for the amount of the adhesive layer after drying to be 120 g/m$^2$, and then dried with a hot air dryer at 60° C. for 20 minutes, so as for an adhesive layer to be laminated thereon.

After drying, the adhesive layer of the footwear constituting member and the adhesive layer of the counterpart member were quickly bonded to each other, and the footwear constituting member and the counterpart member were pressure bonded to each other for 20 seconds with a press machine applying a pressure of 0.1 MPa. Thus, an adhesive structure in which a blend 2 sheet, namely the footwear constituting member and a rubber sheet, namely the counterpart member were made to adhere to each other was obtained. The adhesive structure was allowed to stand still at room temperature for 24 hours, and then cut in a width of 20 mm to prepare a specimen of 20 mm in width and 100 mm in length.

Only in the case of the preparation of the specimen for the evaluation of Example 17, CR was used as an adhesive in place of PU.

(e) Preparation of Polypropylene Resin/EVA Specimen

One surface of a PP sheet (size: 100 mm×50 mm×3 mm in thickness), the surfaces of which were degreased with acetone, was coated with the primer for footwear constituting members by using a brush so as for the amount of the primer layer after drying to be 50 g/m$^2$, and dried with a hot air dryer at 60° C. for 20 minutes to yield a footwear constituting member including a primer layer laminated thereon.

Next, as a counterpart member, a EVA foam sheet [a foam of ethylene/vinyl acetate copolymer, size: 100 mm×50 mm×5 mm, prepared by degreasing one surface of the foam with acetone, applying a primer for EVA (P-740, urethane primer, manufactured by No-tape Industrial Co., Ltd.) to the degreased surface and drying the applied primer) was prepared.

Each of the primer layer surface of the footwear constituting member and the primer surface of the counterpart member was coated with PU by using a brush so as for the amount of the adhesive layer after drying to be 120 g/m$^2$, and then dried with a hot air dryer at 60° C. for 20 minutes, so as for an adhesive layer to be laminated thereon.

After drying, the adhesive layer of the footwear constituting member and the adhesive layer of the counterpart member were quickly bonded to each other, and the footwear constituting member and the counterpart member were pressure bonded to each other for 20 seconds with a press machine applying a pressure of 0.1 MPa. Thus, an adhesive structure in which a PP sheet, namely the footwear constituting member and an EVA sheet, namely the counterpart member were made to adhere to each other was obtained. The adhesive structure was allowed to stand still at room temperature for 24 hours, and then cut in a width of 20 mm to prepare a specimen of 20 mm in width and 100 mm in length.

Only in the case of the preparation of the specimen for the evaluation of Example 17, CR was used as an adhesive in place of PU.

(2) Cold Adhesiveness and Adhesion Retention (Adhesion Strength and Adhesion Strength Retention Rate after Cold Bending)

The specimen obtained in the foregoing "(d) preparation of polypropylene-based resin (blend 2)/rubber specimen" was subjected three times to the following cold bending treatment. Subsequently, the strength (adhesion strength) required for peeling the footwear constituting member and the counterpart member in the specimen from each other was measured by using a tensile tester (Intesco Precision Universal Material Tester, model 2020, manufactured by Intesco Co., Ltd.) under the conditions of a tensile rate of 50 mm/min, 180° peel and 25° C. The measurement was performed with the number of samples of 5, and the average value of the resulting five values was taken as "the adhesion strength after cold bending," with which "the cold adhesiveness" was evaluated.

The value obtained by dividing, as shown in the following formula, the adhesion strength after cold bending by the adhesion strength of the specimen measured in the foregoing "(d) preparation of polypropylene-based resin (blend 2)/rubber specimen" was taken as "the adhesion strength retention rate after cold bending," with which "the adhesion retention" was evaluated.

Adhesion strength retention rate (%) after cold bending=adhesion strength after cold bending/adhesion strength×100

It is meant that the higher the adhesion strength retention rate after cold bending, the more excellent the adhesion retention is. In the case where material failure occurred during the adhesion strength measurement, the retention rate was determined by assuming the adhesion strength to be 100 N/20 mm.

(Cold Bending Treatment)

A specimen was allowed to stand still in a cold room set at −40° C. for 2 hours, then in an environment at −40° C., the whole of the specimen was wound around a column of 5 mm in radius in such a way that the 20-mm side of the specimen was parallel to the axial direction of the column, and then instantly the whole of the specimen was rewound. The operation of the winding and rewinding was repeated 200 times, and then the specimen was allowed to stand still at room temperature for 24 hours.

(3) Adhesiveness and Adhesion Retention in a Harsh Environment (Adhesion Strength and Adhesion Strength Retention Rate after High Temperature-High Humidity Treatment)

The specimen obtained in the foregoing "(a) preparation of polypropylene resin/rubber specimen" was placed in a thermohygrostat maintained at a temperature of 70° C. and a humidity of 75% RH, and was taken out after an elapsed time of 2000 hours.

After being taken out, the specimen was allowed to stand still at room temperature for 24 hours, and then the strength required for peeling the footwear constituting member and the counterpart member in the specimen from each other was measured by using a tensile tester (Intesco Precision Universal Material Tester, model 2020, manufactured by Intesco Co., Ltd.) under the conditions of a tensile rate of 50 mm/min, 180° peel and 25° C. The measurement was performed with the number of samples of 5, and the average value of the resulting five values was taken as "the adhesion strength after high temperature-high humidity treatment," with which "the adhesiveness in a harsh environment" was evaluated.

The value obtained by dividing, as shown in the following formula, the adhesion strength after the high temperature-high humidity treatment by the adhesion strength of the specimen measured in the foregoing "(a) preparation of polypropylene resin/rubber specimen" was taken as "the adhesion strength retention rate after high temperature-high humidity treatment," with which "the adhesion retention" was evaluated.

Adhesion strength retention rate (%) after high temperature-high humidity treatment=adhesion strength after high temperature-high humidity treatment/adhesion strength×100

It is meant that the higher the adhesion strength retention rate after high temperature-high humidity treatment, the more excellent the adhesion retention in a harsh environment is.

In the present invention, the evaluation of "the adhesiveness and adhesion retention in a harsh environment" adopts a high temperature-high humidity condition of a temperature of 70° C. and a humidity of 75% RH, and this condition is a further harsher condition than the environment assumed for practical use of footwear. Accordingly, the case where the adhesiveness is satisfactorily retained even when a treatment is performed for 2000 hours under the condition concerned can be evaluated such that in a harsh environment assumed for practical use of footwear, sufficient adhesiveness is retained over a long period of time.

(4) Water Resistance

One surface of a PP sheet was coated with the primer for footwear constituting members by using a brush so as for the amount of the primer layer after drying to be 50 g/m², and dried with a hot air dryer at 80° C. for 10 minutes. The PP sheet including a primer layer laminated thereon was immersed in warm water at 40° C. for 24 hours. Subsequently, the coating film surface was visually observed, and the water resistance was evaluated on the basis of the following indexes.

G (Good): No change occurs on the coating film.
P (Poor): Coating film is partially or wholly exfoliated.

The acid-modified polyolefin resin was produced by the following method.

Production Example 1

Production of Acid-Modified Polyolefin Resin P-1

In a four-necked flask, in a nitrogen atmosphere, 280 g of a propylene-1-butene copolymer (mass ratio: propylene/1-butene=70/30) was heated and melted, then 25.0 g of maleic anhydride as an unsaturated carboxylic acid and 6.0 g of dicumyl peroxide as a radical generator were separately added to the molten copolymer over 1 hour under stirring while the reaction system temperature was being maintained at 170° C., and then the reaction mixture was allowed to react for 1 hour. After completion of the reaction, the obtained reaction product was placed in a large amount of acetone to solidify the resin. The resin was finely cut and processed into a pellet shape.

Next, the pellet-shaped resin was mixed with acetone in a mass of three times the mass of the resin, and the resulting mixture was stirred for 1 hour while the temperature was being maintained at 50° C., to wash the resin. After collecting the resin, the resin was further washed in the same manner as described above to remove the maleic anhydride in a free state.

The resin after washing was dried under reduced pressure in a reduced-pressure dryer to yield an acid-modified polyolefin resin P-1.

Production Example 2

Production of Acid-Modified Polyolefin Resins P-2, P-3, P-4, P-6 and P-7

Acid-modified propylene resins P-2, P-3, P-4, P-6 and P-7 were obtained in the same manner as in Production Example 1 except that the mass ratios (propylene/1-butene) between propylene and 1-butene were respectively altered as follows: propylene/1-butene=87/13 (P-2), 60/40 (P-3), 95/5 (P-4), 97/3 (P-6) and 50/50 (P-7).

Production Example 3

Production of Acid-Modified Polyolefin Resin P-5

An acid-modified polyolefin resin P-5 was obtained in the same manner as in Production Example 1 except that in place of the propylene-1-butene copolymer, a propylene-ethylene copolymer (mass ratio; propylene/ethylene=92/8) was used.

Production Example 4

Production of Acid-Modified Polyolefin Resin P-8

An acid-modified polyolefin resin was obtained in the same manner as in Production Example 1 except that the cleaning of the resin in Production Example 1 was not performed in Production Example 4. Specifically, in a four-necked flask, in a nitrogen atmosphere, 280 g of the propylene-1-butene copolymer (mass ratio: propylene/1-butene=70/30) was heated and melted, then 25.0 g of maleic anhydride as an unsaturated carboxylic acid and 6.0 g of dicumyl peroxide as a radical generator were separately added to the molten copolymer over 1 hour under stirring while the reaction system temperature was being maintained at 170° C., and then the reaction mixture was allowed to react for 1 hour. After completion of the reaction, the obtained reaction product was placed in a large amount of acetone to solidify the resin. The resin was dried under reduced pressure in a reduced-pressure dryer to yield an acid-modified polyolefin resin P-8.

Production Example 5

Production of Acid-Modified Polyolefin Resin P-9

In a four-necked flask, in a nitrogen atmosphere, 280 g of the propylene-1-butene copolymer (mass ratio: propylene/

1-butene=70/30) was heated and melted, then 35.0 g of maleic anhydride as an unsaturated carboxylic acid and 8.0 g of dicumyl peroxide as a radical generator were separately added to the molten copolymer over 1 hour under stirring while the reaction system temperature was being maintained at 170° C., and then the reaction mixture was allowed to react for 1 hour. After completion of the reaction, the obtained reaction product was placed in a large amount of acetone to solidify the resin. The resin was dried under reduced pressure in a reduced-pressure dryer to yield an acid-modified polyolefin resin P-9.

Production Example 6

Production of Acid-Modified Polyolefin Resin P-10

An acid-modified polyolefin resin was obtained by altering the method for cleaning the resin in Production Example 1. Specifically, in a four-necked flask, in a nitrogen atmosphere, 280 g of the propylene-1-butene copolymer (mass ratio: propylene/1-butene=70/30) was heated and melted, then 25.0 g of maleic anhydride as an unsaturated carboxylic acid and 6.0 g of dicumyl peroxide as a radical generator were separately added to the molten copolymer over 1 hour under stirring while the reaction system temperature was being maintained at 170° C., and then the reaction mixture was allowed to react for 1 hour. After completion of the reaction, the obtained reaction product was placed in a large amount of acetone to solidify the resin. The resin was finely cut and processed into a pellet shape.

Next, the pellet-shaped resin was mixed with acetone in a mass of three times the mass of the resin, and the resulting mixture was stirred for 1 hour while the temperature was being maintained at 50° C., to wash the resin. After collecting the resin, the resin was further mixed with a cleaning liquid [acetone/dimethylaminoethanol=90/10 (mass ratio)] composed of acetone and dimethylaminoethanol in a mass of three times the mass of the resin, and the resulting mixture was stirred for 1 hour while the temperature was being maintained at 50° C., to wash the resin and to remove the maleic anhydride in a free state.

The resin after washing was dried under reduced pressure in a reduced-pressure dryer to yield an acid-modified polyolefin resin P-10.

Production Example 7

Production of Acid-Modified Polyolefin Resin P-11

In a four-necked flask, in a nitrogen atmosphere, 280 g of the propylene-1-butene copolymer (mass ratio: propylene/1-butene=70/30) was heated and melted, then 1.0 g of maleic anhydride as an unsaturated carboxylic acid and 1.0 g of dicumyl peroxide as a radical generator were separately added to the molten copolymer over 1 hour under stirring while the reaction system temperature was being maintained at 170° C., and then the reaction mixture was allowed to react for 1 hour. After completion of the reaction, the obtained reaction product was placed in a large amount of acetone to solidify the resin. The resin was finely cut and processed into a pellet shape.

Next, the pellet-shaped resin was mixed with acetone in a mass of three times the mass of the resin, and the resulting mixture was stirred for 1 hour while the temperature was being maintained at 50° C., to wash the resin. After collecting the resin, the resin was further washed in the same manner as described above to remove the maleic anhydride in a free state.

The resin after washing was dried under reduced pressure in a reduced-pressure dryer to yield an acid-modified polyolefin resin P-11.

The properties of the acid-modified polyolefin resins (P-1 to 11) are shown in Table 1.

TABLE 1

| | Composition | | | | Properties | | |
|---|---|---|---|---|---|---|---|
| Acid-modified polyolefin resin | Olefin units (parts by mass) | | Unsaturated carboxylic acid unit (parts by mass*) | Weight average molecular weight | Residual content of unreacted unsaturated carboxylic acid monomer component (ppm) | Vicat softening point (° C.) | Melting point (° C.) |
| | Propylene unit (A) | Olefin unit (B) other than propylene unit | | | | | |
| | | 1-Butene | Ethylene | Maleic anhydride | | | | |
| P-1 | 70 | 30 | 0 | 4.2 | 42,000 | 452 | 64 | 75 |
| P-2 | 87 | 13 | 0 | 4.0 | 41,000 | 467 | 76 | 86 |
| P-3 | 60 | 40 | 0 | 4.2 | 45,000 | 492 | 55 | 66 |
| P-4 | 95 | 5 | 0 | 4.2 | 41,000 | 486 | 94 | 113 |
| P-5 | 92 | 0 | 8 | 4.3 | 40,000 | 459 | 110 | 130 |
| P-6 | 97 | 3 | 0 | 4.7 | 50,000 | 455 | 51 | 60 |
| P-7 | 50 | 50 | 0 | 4.1 | 50,000 | 449 | 95 | 115 |
| P-8 | 70 | 30 | 0 | 4.2 | 42,000 | 8,452 | 64 | 75 |
| P-9 | 70 | 30 | 0 | 5.3 | 40,000 | 10,117 | 64 | 74 |
| P-10 | 70 | 30 | 0 | 4.2 | 42,000 | 88 | 64 | 75 |
| P-11 | 70 | 30 | 0 | 0.09 | 45,000 | 110 | 65 | 76 |

*Parts by mass in relation to 100 parts by mass of the total amount of the propylene unit (A) and the olefin unit (B) other than the propylene unit Example 1

By using a stirrer equipped with a hermetically sealable, pressure-proof 1-liter volume glass vessel with a heater attached thereto, 130.0 g of the acid-modified polyolefin resin (P-1), 25.0 g of ethylene glycol monobutyl ether, 100.0 g of isopropanol, 15.0 g of dimethylaminoethanol and 230.0 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the system temperature was being maintained at 160° C., the mixture was further stirred for 60 minutes, and subsequently the power source of the heater was turned off to allow the mixture to be spontaneously cooled.

When the system temperature was cooled down to 80° C., the vessel was unsealed, and a raw material composed of 100.0 g of tetrahydrofuran, 10.0 g of dimethylaminoethanol and 40.0 g of distilled water was additionally placed in the vessel. Then, the vessel was sealed, the power source of the heater was turned on, and the resulting mixture was again heated under the condition of the rotation speed of the stirrer blades set at 300 rpm. While the system temperature was being maintained at 140° C., the mixture was further stirred for 60 minutes, and subsequently the power source of the heater was turned off to allow the mixture to be spontaneously cooled.

The mixture was cooled down to room temperature (about 25° C.) while the mixture was being stirred with the rotational speed still set at 300 rpm, and then the mixture was filtered with a 300-mesh stainless steel filter (wire diameter: 0.035 mm, plain weave) under pressure (air pressure: 0.2 MPa) to yield a primer for footwear constituting members composed of an aqueous dispersion. After the filtration, no undispersed matter of the resin was able to be identified on the filter.

By using the obtained primer for footwear constituting members, the properties of the aqueous dispersion and the performances of the primer were evaluated.

Examples 2 to 5 and 18 to 20, and Comparative Examples 1 and 2

Primers for footwear constituting members being each composed of an aqueous dispersion were obtained in the same manner as in Example 1 except that as the acid-modified polyolefin resin, P-2 (Example 2), P-3 (Example 3), P-4 (Example 4), P-5 (Example 5), P-8 (Example 18), P-9 (Example 19), P-10 (Example 20). P-6 (Comparative Example 1) or P-7 (Comparative Example 2) was used. In each of Examples 2 to 5 and 18 to 20 and Comparative Examples 1 and 2, no undispersed matter of the resin was able to be identified on the filter.

By using the obtained primers for footwear constituting members, the properties of the aqueous dispersions and the performances of the primers were evaluated.

Example 6

All the raw materials used in Example 1 were placed together at once in a reaction vessel, and thus, an aqueous dispersion was obtained. Specifically, by using a stirrer equipped with a hermetically sealable, pressure-proof 1-liter volume glass vessel with a heater attached thereto, 130.0 g of the acid-modified polyolefin resin (P-1), 25.0 g of ethylene glycol monobutyl ether, 100.0 g of isopropanol, 100.0 g of tetrahydrofuran, 25.0 g of dimethylaminoethanol and 270.0 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the system temperature was being maintained at 160° C., the mixture was further stirred for 60 minutes, and subsequently while the system temperature was being maintained at 140° C. by regulating the output power of the heater, the mixture was further stirred for 60 minutes, and then the power source of the heater was turned off to allow the mixture to be spontaneously cooled.

The mixture was cooled down to room temperature (about 25° C.) while the mixture was being stirred with the rotational speed still set at 300 rpm, and then the mixture was filtered with a 300-mesh stainless steel filter (wire diameter: 0.035 mm, plain weave) under pressure (air pressure: 0.4 MPa) to yield a primer for footwear constituting members composed of an aqueous dispersion. After the filtration, a certain quantity of undispersed matter of the acid-modified polyolefin resin was identified on the filter.

By using the obtained primer for footwear constituting members, the properties of the aqueous dispersion and the performances of the primer were evaluated.

Example 7

By using a stirrer equipped with a hermetically sealable, pressure-proof 1-liter volume glass vessel with a heater attached thereto, 130.0 g of the acid-modified polyolefin resin (P-1), 25.0 g of ethylene glycol monobutyl ether, 100.0 g of isopropanol, 15.0 g of dimethylaminoethanol and 230.0 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the system temperature was being maintained at 160° C., the mixture was further stirred for 60 minutes, and subsequently the power source of the heater was turned off to allow the mixture to be spontaneously cooled.

When the system temperature was cooled down to 80° C., the vessel was unsealed, and a raw material composed of 50.0 g of tetrahydrofuran, 5.0 g of dimethylaminoethanol and 95.0 g of distilled water was additionally placed in the vessel. Then, the vessel was sealed, the power source of the heater was turned on, and the resulting mixture was again heated under the condition of the rotation speed of the stirrer blades set at 300 rpm. While the system temperature was being maintained at 140° C., the mixture was further stirred for 60 minutes, and subsequently the power source of the heater was turned off to allow the mixture to be spontaneously cooled.

The mixture was cooled down to room temperature (about 25° C.) while the mixture was being stirred with the rotational speed still set at 300 rpm, and then the mixture was filtered with a 300-mesh stainless steel filter (wire diameter: 0.035 mm, plain weave) under pressure (air pressure: 0.2 MPa) to yield a primer for footwear constituting members composed of an aqueous dispersion. After the filtration, no undispersed matter of the resin was able to be identified on the filter.

By using the obtained primer for footwear constituting members, the properties of the aqueous dispersion and the performances of the primer were evaluated.

Example 8

An isocyanate-based cross-linking agent (Duranate MF-K60B, manufactured by Asahi Kasei Chemicals Corp., solid content concentration: 60% by mass, block-type isocyanate cross-linking agent) as an additive was added to and mixed with the primer for footwear constituting members obtained in Example 1 to yield a primer for footwear constituting members. The addition amount of the cross-linking agent was such that the cross-linking agent was added so as for the solid content in the isocyanate-based cross-linking agent to be 5 parts by mass in relation to 100 parts by mass of the acid-modified polyolefin resin in the primer for footwear constituting members.

By using the obtained primer for footwear constituting members, the properties of the aqueous dispersion and the performances of the primer were evaluated.

Example 9

An amine-based cross-linking agent (a 10% by mass aqueous solution of dihydrazide adipate) as an additive was added to and mixed with the primer for footwear constituting members obtained in Example 1 to yield a primer for footwear constituting members. The addition amount of the cross-linking agent was such that the cross-linking agent was added so as for the dihydrazide adipate in the amine-based cross-linking agent to be 5 parts by mass in relation to 100 parts by mass of the acid-modified polyolefin resin in the primer for footwear constituting members.

By using the obtained primer for footwear constituting members, the properties of the aqueous dispersion and the performances of the primer were evaluated.

Example 10

An epoxy-based cross-linking agent (SR-PG, manufactured by Sakamoto Yakuhin Kogyo Co., Ltd., solid content concentration: 99% by mass, propylene glycol diglycidyl ether) as an additive was added to and mixed with the primer for footwear constituting members obtained in Example 1 to yield a primer for footwear constituting members. The addition amount of the cross-linking agent was such that the cross-linking agent was added so as for the solid content proportion in the epoxy-based cross-linking agent to be 5 parts by mass in relation to 100 parts by mass of the acid-modified polyolefin resin in the primer for footwear constituting members.

By using the obtained primer for footwear constituting members, the properties of the aqueous dispersion and the performances of the primer were evaluated.

Example 11

An oxazoline-based cross-linking agent (Epocros WS700, manufactured by Nippon Shokubai Co., Ltd., solid content concentration: 25% by mass, polyoxazoline group-containing acrylic resin aqueous solution) as an additive was added to and mixed with the primer for footwear constituting members obtained in Example 1 to yield a primer for footwear constituting members. The addition amount of the cross-linking agent was such that the cross-linking agent was added so as for the solid content proportion in the oxazoline-based cross-linking agent to be 5 parts by mass in relation to 100 parts by mass of the acid-modified polyolefin resin in the primer for footwear constituting members.

By using the obtained primer for footwear constituting members, the properties of the aqueous dispersion and the performances of the primer were evaluated.

Example 12

A carbodiimide-based cross-linking agent (Carbodilite SV-02, manufactured by Nisshinbo Chemical Inc., solid content concentration: 40% by mass) as an additive was added to and mixed with the primer for footwear constituting members obtained in Example 1 to yield a primer for footwear constituting members. The addition amount of the cross-linking agent was such that the cross-linking agent was added so as for the solid content proportion in the carbodiimide-based cross-linking agent to be 5 parts by mass in relation to 100 parts by mass of the acid-modified polyolefin resin in the primer for footwear constituting members.

By using the obtained primer for footwear constituting members, the properties of the aqueous dispersion and the performances of the primer were evaluated.

Example 13

A melamine-based cross-linking agent (Cymel 325, manufactured by Nihon Cytec Industries Inc., solid content concentration: 80% by mass) as an additive was added to and mixed with the primer for footwear constituting members obtained in Example 1 to yield a primer for footwear constituting members. The addition amount of the cross-linking agent was such that the cross-linking agent was added so as for the solid content proportion in the melamine-based cross-linking agent to be 5 parts by mass in relation to 100 parts by mass of the acid-modified polyolefin resin in the primer for footwear constituting members.

By using the obtained primer for footwear constituting members, the properties of the aqueous dispersion and the performances of the primer were evaluated.

Example 14

A polyurethane resin aqueous dispersion (Adeka Bontiter HUX350, manufactured by Adeka Corp., solid content concentration: 30% by mass, free from nonvolatile aqueous dispersing aid, polyether type polyurethane resin aqueous dispersion) as an additive was added to and mixed with the primer for footwear constituting members obtained in Example 1 to yield a primer for footwear constituting members. The addition amount of the polyurethane resin aqueous dispersion was such that the polyurethane resin aqueous dispersion was added so as for the solid content in the polyurethane resin aqueous dispersion to be 100 parts by mass in relation to 100 parts by mass of the acid-modified polyolefin resin in the primer for footwear constituting members.

By using the obtained primer for footwear constituting members, the properties of the aqueous dispersion and the performances of the primer were evaluated.

Example 15

By using a stirrer equipped with a 1-liter volume glass vessel with a heater attached thereto, 50.0 g of the acid-modified polyolefin resin (P-1) and 200.0 g of toluene were placed in the glass vessel, and the resulting mixture was stirred by setting the rotation speed of the stirrer blades at 100 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the system temperature was being maintained at 80° C., the mixture was further stirred for 30 minutes, and subsequently the power source of the heater was turned off to allow the mixture to be spontaneously cooled.

The mixture was cooled down to room temperature (about 25° C.) while the mixture was being stirred with the rotational speed still set at 100 rpm, and then the mixture was filtered with a 300-mesh stainless steel filter (wire diameter: 0.035 mm, plain weave) under pressure (air pressure: 0.2 MPa) to yield a primer for footwear constituting members composed of a resin solution based on an organic solvent. After the filtration, no undissolved resin was able to be identified on the filter.

By using the obtained primer for footwear constituting members, the performances of the primer were evaluated.

Example 16

An isocyanate-based cross-linking agent (Desmodur RE, manufactured by Sumika Bayer Urethane Co., Ltd., nonvolatile component concentration: 23% by mass) was added to and mixed with the primer for footwear constituting members obtained in Example 15 to yield a primer for footwear constituting members. The addition amount of the cross-linking agent was such that the cross-linking agent was added so as for the nonvolatile component in the isocyanate-based cross-linking agent to be 5 parts by mass in relation to 100 parts by mass of the acid-modified polyolefin resin in the primer for footwear constituting members.

By using the obtained primer for footwear constituting member, the performances of the primer were evaluated.

Example 17

CR was used as an adhesive in place of PU, in the preparation of the specimen for the evaluation of the primer performances of the primer for footwear constituting members obtained in Example 1, and the performances of the primer were evaluated by using the thus obtained specimen.

Example 21

An aqueous dispersion was obtained by using P-10 as the acid-modified polyolefin resin in place of P-1 in Example 6. Specifically, by using a stirrer equipped with a hermetically sealable, pressure-proof 1-liter volume glass vessel with a heater attached thereto, 130.0 g of the acid-modified polyolefin resin (P-10), 25.0 g of ethylene glycol monobutyl ether, 100.0 g of isopropanol, 100.0 g of tetrahydrofuran, 25.0 g of dimethylaminoethanol and 270.0 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the system temperature was being maintained at 160° C., the mixture was further stirred for 60 minutes, and subsequently while the system temperature was being maintained at 140° C. by regulating the output power of the heater, the mixture was further stirred for 60 minutes, and then the power source of the heater was turned off to allow the mixture to be spontaneously cooled.

The mixture was cooled down to room temperature (about 25° C.) while the mixture was being stirred with the rotational speed still set at 300 rpm, and then the mixture was filtered with a 300-mesh stainless steel filter (wire diameter: 0.035 mm, plain weave) under pressure (air pressure: 0.4 MPa) to yield a primer for footwear constituting members composed of an aqueous dispersion. After the filtration, a certain quantity of undispersed matter of the acid-modified polyolefin resin was identified on the filter.

By using the obtained primer for footwear constituting members, the properties of the aqueous dispersion and the performances of the primer were evaluated.

Comparative Example 3

A resin solution based on an organic solvent was obtained in the same manner as in Example 15 except that in place of the acid-modified polyolefin resin (P-1), a propylene-1-butene copolymer (mass ratio: propylene/1-butene=70/30, weight average molecular weight: 55000, melting point: 78° C., Vicat softening point: 67° C., containing no unsaturated carboxylic acid unit, hereinafter referred to as "P1-B") was used. After the filtration, no undissolved resin was able to be identified on the filter.

By using the obtained resin solution, the performances of the primer were evaluated.

Comparative Example 4

An attempt was made to obtain a primer for footwear constituting members composed of an aqueous dispersion in the same manner as in Example 1 except that P-11 was used as an acid-modified polyolefin resin; however, the acid-modified polyolefin resin (P-11) was not dispersed at all, and was not able to be processed into an aqueous dispersion.

Accordingly, no evaluation of the performances of the primer was able to be performed.

Reference Example 1

A preparation of an aqueous dispersion of a resin was performed by a method according to Example 1 except that in addition to the raw materials used in Example 1, 4.0 g of a nonvolatile aqueous dispersing aid (Noigen EA-190D, nonionic surfactant, manufactured by Dai-ichi Kogyo Seiyaku Co., Ltd.) was added at the time of the raw material placement in the initial stage, and thus a primer for footwear constituting members composed of an aqueous dispersion was obtained. After the filtration, no undispersed matter of the resin was able to be identified on the filter.

By using the obtained primer for footwear constituting members, the properties of the aqueous dispersion and the performances of the primer were evaluated.

Table 2 shows the properties and the evaluation results of the various performances of the primers for footwear constituting members used in Examples 1 to 21, Comparative Examples 1 to 3 and Reference Example 1.

TABLE 2

| | | | | Constitution of primer | | | | |
|---|---|---|---|---|---|---|---|---|
| | | Acid-modified polyolefin resin | Medium | Dispersion method[2] | Properties of aqueous dispersion | | | Additive |
| | | | | | Particle size (μm) | | Degree of dispersion | |
| | | | | | mw | mn | | |
| Examples | 1 | P-1 | Aqueous medium | A | 0.020 | 0.016 | 1.25 | — |
| | 2 | P-2 | Aqueous medium | A | 0.091 | 0.063 | 1.44 | — |
| | 3 | P-3 | Aqueous medium | A | 0.142 | 0.058 | 2.45 | — |
| | 4 | P-4 | Aqueous medium | A | 0.138 | 0.059 | 2.34 | — |
| | 5 | P-5 | Aqueous medium | A | 0.102 | 0.067 | 1.52 | — |
| | 6 | P-1 | Aqueous medium | B | 0.515 | 0.200 | 2.58 | — |
| | 7 | P-1 | Aqueous medium | A | 0.183 | 0.93 | 1.97 | — |
| | 8 | P-1 | Aqueous medium | A | 0.031 | 0.024 | 1.29 | Isocyanate-based cross-linking agent |
| | 9 | P-1 | Aqueous medium | A | 0.025 | 0.02 | 1.25 | Amine-based cross-linking agent |
| | 10 | P-1 | Aqueous medium | A | 0.024 | 0.018 | 1.33 | Epoxy-based cross-linking agent |
| | 11 | P-1 | Aqueous medium | A | 0.023 | 0.018 | 1.28 | Oxazoline-based cross-linking agent |
| | 12 | P-1 | Aqueous medium | A | 0.035 | 0.027 | 1.30 | Carbodiimide-based cross-linking agent |
| | 13 | P-1 | Aqueous medium | A | 0.039 | 0.028 | 1.39 | Melamine-based cross-linking agent |
| | 14 | P-1 | Aqueous medium | A | 0.066 | 0.050 | 1.32 | Polyurethane resin |
| | 15 | P-1 | Organic solvent | — | — | — | — | — |
| | 16 | P-1 | Organic solvent | — | — | — | — | Isocyanate-based cross-linking agent |
| | 17 | P-1 | Aqueous medium | A | 0.020 | 0.016 | 1.25 | — |
| | 18 | P-8 | Aqueous medium | A | 0.022 | 0.015 | 1.47 | — |
| | 19 | P-9 | Aqueous medium | A | 0.017 | 0.014 | 1.21 | — |
| | 20 | P-10 | Aqueous medium | A | 0.021 | 0.015 | 1.40 | — |
| | 21 | P-10 | Aqueous medium | B | 0.535 | 0.210 | 2.54 | — |
| Comparative Examples | 1 | P-6 | Aqueous medium | A | 0.270 | 0.096 | 2.81 | — |
| | 2 | P-7 | Aqueous medium | A | 0.251 | 0.084 | 2.99 | — |
| | 3 | P1-B | Organic solvent | — | — | — | — | — |
| | 4 | P-11 | Processing into aqueous dispersion was impossible. | | | | | |
| Reference Example 1 | | P-1 | Emulsifier[1] | A | 0.170 | 0.058 | 2.93 | — |

| | | Properties of primer | | | | | | | | |
|---|---|---|---|---|---|---|---|---|---|---|
| | | Adhesion strength (N/20 mm)[3] | | | | | | Adhesion strength retention rate (%) | | |
| | | | PP/rubber | | | | Blend 2/rubber | | | |
| | Adhesive | | After high temperature-high humidity treatment | PE/rubber | Blend 1/rubber | | After cold bending | PP/EVA | After high temperature-high humidity treatment | After cold bending | Water resistance |
| Examples | 1 | PU | 84 | 61 | 62 | Breakage | Breakage | Breakage | Breakage | 73 | 100 | G |
| | 2 | PU | 63 | 50 | 49 | 60 | 88 | 79 | 56 | 79 | 90 | G |
| | 3 | PU | 35 | 15 | 34 | 25 | 36 | 18 | 33 | 43 | 50 | G |
| | 4 | PU | 25 | 19 | 21 | 28 | 32 | 16 | 30 | 76 | 50 | G |
| | 5 | PU | 41 | 33 | Breakage | 39 | 63 | 56 | 49 | 80 | 89 | G |
| | 6 | PU | 46 | 32 | 40 | 52 | 56 | 31 | 39 | 70 | 55 | G |
| | 7 | PU | 59 | 42 | 43 | 59 | Breakage | 85 | 50 | 71 | 85 | G |
| | 8 | PU | 125 | 95 | Breakage | Breakage | Breakage | Breakage | Breakage | 76 | 100 | G |
| | 9 | PU | 111 | 83 | Breakage | Breakage | Breakage | Breakage | Breakage | 75 | 100 | G |
| | 10 | PU | 119 | 89 | Breakage | Breakage | Breakage | Breakage | Breakage | 75 | 100 | G |
| | 11 | PU | 105 | 77 | 63 | Breakage | Breakage | Breakage | Breakage | 73 | 100 | G |
| | 12 | PU | 108 | 80 | 58 | Breakage | Breakage | Breakage | Breakage | 74 | 100 | G |
| | 13 | PU | 92 | 66 | 65 | Breakage | Breakage | 61 | Breakage | 72 | 61 | G |
| | 14 | PU | 131 | 100 | Breakage | Breakage | Breakage | Breakage | Breakage | 76 | 100 | G |
| | 15 | PU | 41 | 28 | 34 | 47 | 53 | 30 | 33 | 68 | 57 | G |

TABLE 2-continued

| | # | Type | | | | | | | | | | |
|---|---|---|---|---|---|---|---|---|---|---|---|---|
| | 16 | PU | 102 | 71 | 60 | Breakage | Breakage | Breakage | Breakage | 70 | 100 | G |
| | 17 | CR | 45 | 29 | 39 | 50 | 57 | 55 | 50 | 64 | 96 | G |
| | 18 | PU | 84 | 52 | 62 | Breakage | Breakage | Breakage | Breakage | 62 | 100 | G |
| | 19 | PU | 84 | 29 | 62 | Breakage | Breakage | Breakage | Breakage | 35 | 100 | G |
| | 20 | PU | 86 | 83 | 65 | Breakage | Breakage | Breakage | Breakage | 97 | 100 | G |
| | 21 | PU | 45 | 40 | 40 | 51 | 57 | 31 | 38 | 89 | 54 | G |
| Comparative | 1 | PU | 7 | 2 | 5 | 6 | 11 | 4 | 8 | 29 | 36 | G |
| Examples | 2 | PU | 14 | 0 | 31 | 9 | 15 | 4 | 14 | 0 | 27 | G |
| | 3 | PU | 14 | 4 | 8 | 14 | 19 | 14 | 16 | 29 | 74 | G |
| | 4 | | No evaluation because of obtaining no primer | | | | | | | | | |
| Reference Example 1 | | PU | 45 | 0 | 39 | 51 | 53 | 50 | 39 | 0 | 94 | P |

1) Emulsifier-containing aqueous dispersion
2) Method A: Method in which in aqueous dispersion preparation, raw materials are not placed together at once but are partially additionally placed; Method B: Method in which in aqueous dispersion preparation, all the raw materials are placed together at once.
3) Breakage represents the occurrence of material failure in PE, blend 1, blend 2 or EVA.

The primers for footwear constituting members used in Examples 1 to 21 were excellent in the adhesiveness between various footwear constituting members (materials used in footwear constituting members), and also in the cold adhesiveness and in the adhesiveness in harsh environments. These performances were remarkable due to the conditions that the particle size and the degree of dispersion of the aqueous dispersion, and the residual amount of the unsaturated carboxylic acid component fell within the ranges specified in the present invention.

On the contrary, in Comparative Examples 1 to 3, the acid-modified polyolefin resins specified in the present invention were not used, and hence the primers were poor in various performances.

In each of Examples 2 to 5, the olefin unit and the composition ratio of the acid-modified polyolefin resin deviated from the preferable ranges specified in the present invention, and consequently the resulting adhesiveness was slightly poorer as compared with the case of Example 1. However, in Examples 2, 4 and 5, the adhesion retention in a harsh environment was better than the adhesion retention in Example 1. This is probably because the Vicat softening point temperature (the temperature serving as the index of heat resistance) of each of the acid-modified polyolefin resins used exceeded the temperature (70° C.) of the evaluation test.

In each of Examples 6 and 7, the particle size and the degree of dispersion of the aqueous dispersion deviated from the preferable ranges specified in the present invention, and consequently the adhesiveness and the like are slightly poorer as compared with the case of Example 1.

In each of Examples 8 to 13, a different cross-linking agent was added to the primer for footwear constituting members, and the addition of the cross-linking agent generally improved the adhesiveness and the like in the performances of the primer as compared with the case of Example 1 where no cross-linking agent was added. However, the melamine-based cross-linking agent (Example 13) was slightly lower in the effect of the addition thereof, and moreover, the cold adhesiveness was poorer than the case of Example 1 where no cross-linking agent was added. The detailed causes of the poorer cold adhesiveness is not clear, but probably the cross-linking made the primer layer harder and accordingly the cold bending caused strain between the footwear constituting member and the primer to degrade the strength. The other cross-linking agents (Examples 8 to 12) resulted in excellent cold adhesiveness, and hence these cross-linking agents probably maintained the flexibilities of the primer layers, and additionally developed the effects of the cross-linking.

In Example 14, the addition of a polyurethane resin to the acid-modified polyolefin resin resulted in verification of excellent primer performances.

Example 15 is a primer for footwear constituting members composed of an acid-modified polyolefin resin solution using as the medium an organic solvent, and was poorer in performances such as adhesiveness than the case (Example 1) where an aqueous dispersion was used. Detailed causes for this phenomenon are not clear. In Example 15, in the step of drying the adhesive (PU) applied to the primer layer at 60° C., the occurrence of the clouding of PU was identified. In Examples other than Example 15, during the drying of the adhesive PU or CR, no occurrence of the clouding of the adhesive was identified.

In Example 16, even in the primer for footwear constituting members composed of the acid-modified polyolefin resin solution using as the medium an organic solvent, the addition of a cross-linking agent was verified to make satisfactory the primer performances.

In Example 17, a chloroprene-based adhesive was used as an adhesive to be applied to a primer layer obtained from the primer for footwear constituting members of the present invention, and consequently the adhesiveness and the like were found to be slightly poorer as compared with the cases where a urethane-based adhesive was used.

In each of Examples 18 and 19, the residual amount of maleic anhydride, an unreacted unsaturated carboxylic acid monomer component was large, and consequently the adhesiveness and the adhesion retention in a harsh environment were poor. On the other hand, in each of Examples 20 and 21, the residual amount of maleic anhydride was small, and consequently, the adhesiveness and the adhesion retention in a harsh environment were excellent.

In Comparative Example 4, the content of the unsaturated carboxylic acid unit in the acid-modified polyolefin resin was small, and accordingly the processing of the acid-modified polyolefin resin into an aqueous dispersion was impossible.

In Reference Example 1, in the preparation of an aqueous dispersion of the acid-modified polyolefin resin, a nonvolatile aqueous dispersing aid was used, and consequently, Reference Example 1 was poorer in adhesiveness and the like than Example 1 including no nonvolatile aqueous dispersing aid.

The invention claimed is:
1. A primer for footwear constituting members comprising an acid-modified polyolefin resin and a medium,
wherein the acid-modified polyolefin resin is a copolymer including an olefin unit and an unsaturated carboxylic acid unit as copolymerization components;

the copolymer includes as the olefin unit, a propylene unit (A) and an olefin unit (B) other than the propylene unit;

a mass ratio (A/B) between the propylene unit (A) and the olefin unit (B) other than the propylene unit is 60/40 to 95/5;

a content of the unsaturated carboxylic acid unit is 0.1 to 10 parts by mass in relation to 100 parts by mass of a total amount of the propylene unit (A) and the olefin unit (B) other than the propylene unit; and a content of a nonvolatile aqueous dispersing aid is 2% by mass or less in relation to the acid-modified polyolefin resin component.

2. The primer for footwear constituting members according to claim 1, wherein a residual amount of an unreacted unsaturated carboxylic acid monomer component included in the acid-modified polyolefin resin is 10,000 ppm or less.

3. The primer for footwear constituting members according to claim 1, wherein the medium is an aqueous medium, the acid-modified polyolefin resin is dispersed in the aqueous medium, and a weight average particle size of the acid-modified polyolefin resin dispersed in the aqueous medium is 0.5 µm or less.

4. The primer for footwear constituting members according to claim 1, wherein the olefin unit (B) other than the propylene unit is butene.

5. The primer for footwear constituting members according to claim 3, wherein a degree of dispersion in a particle size distribution of the acid-modified polyolefin resin in the aqueous dispersion is 2.6 or less.

6. The primer for footwear constituting members according to claim 1, further comprising a polyurethane resin, wherein a content of the polyurethane resin is 5 to 300 parts by mass in relation to 100 parts by mass of the acid-modified polyolefin resin.

7. The primer for footwear constituting members according to claim 1, further comprising a cross-linking agent, wherein a content of the cross-linking agent is 0.1 to 30 parts by mass in relation to 100 parts by mass of the acid-modified polyolefin resin.

8. The primer for footwear constituting members according to claim 1, wherein the footwear constituting members are members made of a polyolefin-based resin.

9. A footwear constituting member wherein a primer layer obtained from the primer for footwear constituting members according to claim 1 is laminated on at least a part of a surface of the member.

10. A set of footwear comprising the footwear constituting member according to claim 9.

11. A set of footwear wherein the footwear constituting member according to claim 9 is made to adhere through the intermediary of a urethane-based adhesive provided on the primer layer.

12. A method for producing a primer for footwear constituting members, wherein the production method is a method for producing the primer for footwear constituting members according to claim 1; the acid-modified polyolefin resin, a basic compound, an organic solvent and water are stirred in a hermetically sealed vessel at 80 to 240° C.; subsequently, at least one selected from the basic compound, the organic solvent and water is added to a stirred mixture; and a resulting mixture is stirred in the hermetically sealed vessel at 80 to 240° C.

* * * * *